(12) United States Patent
Yu et al.

(10) Patent No.: US 10,921,610 B2
(45) Date of Patent: Feb. 16, 2021

(54) IMAGING SYSTEM

(71) Applicant: SZ DJI TECHNOLOGY CO., LTD., Shenzhen (CN)

(72) Inventors: Lifu Yu, Shenzhen (CN); Zisheng Cao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 270 days.

(21) Appl. No.: 16/082,496

(22) PCT Filed: Oct. 23, 2015

(86) PCT No.: PCT/CN2015/092748
§ 371 (c)(1),
(2) Date: Sep. 5, 2018

(87) PCT Pub. No.: WO2017/067005
PCT Pub. Date: Apr. 27, 2017

(65) Prior Publication Data
US 2019/0121156 A1    Apr. 25, 2019

(51) Int. Cl.
| G02B 27/64 | (2006.01) |
| G03B 15/00 | (2006.01) |
| G02B 7/10 | (2021.01) |
| H04N 5/232 | (2006.01) |
| G03B 5/00 | (2021.01) |

(52) U.S. Cl.
CPC .......... G02B 27/646 (2013.01); G02B 7/102 (2013.01); G03B 5/00 (2013.01); G03B 15/006 (2013.01); H04N 5/23296 (2013.01); G03B 2205/0023 (2013.01)

(58) Field of Classification Search
CPC .......... G02B 27/646; G03B 2205/0007; G03B 5/00; G03B 5/02; G03B 17/56; G03B 15/006; H04N 5/23296
USPC ........................................................ 359/557
See application file for complete search history.

(56) References Cited

U.S. PATENT DOCUMENTS

2012/0057673 A1\* 3/2012 Campbell ............. G01T 1/2018
378/62
2018/0005643 A1\* 1/2018 Tsingos ............... G10L 21/0216

FOREIGN PATENT DOCUMENTS

| CN | 102213814 A | 10/2011 |
| CN | 104781581 A | 7/2015 |
| CN | 204615941 U | 9/2015 |
| CN | 204619941 U | 9/2015 |
| CN | 108027492 A | 5/2018 |
| JP | H04282605 A | 10/1992 |
| JP | H09265131 A | 10/1997 |
| JP | 2010039350 A | 2/2010 |

OTHER PUBLICATIONS

JP 2010039350 google patents translation, obtained Mar. 24, 2020.\*
The World Intellectual Property Organization (WIPO) International Search Report and Written Opinion for PCT/CN2015/092748 dated Jul. 28, 2016 9 Pages.

\* cited by examiner

*Primary Examiner* — Kristina M Deherrera
(74) *Attorney, Agent, or Firm* — Anova Law Group, PLLC

(57) ABSTRACT

Imaging systems having counterweights are provided. The counterweights may be operably coupled to one or more lens elements and may be configured to maintain a stability of the imaging system.

16 Claims, 14 Drawing Sheets

[Fig. 1]
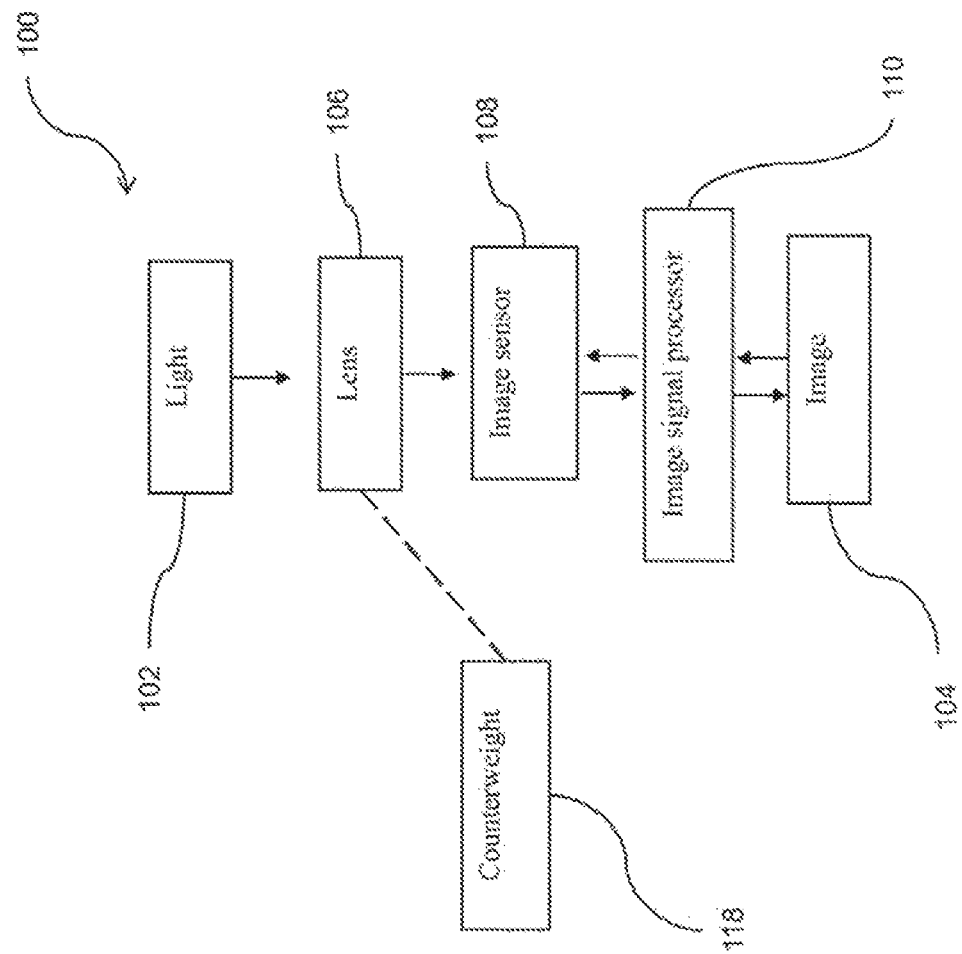

[Fig. 2]
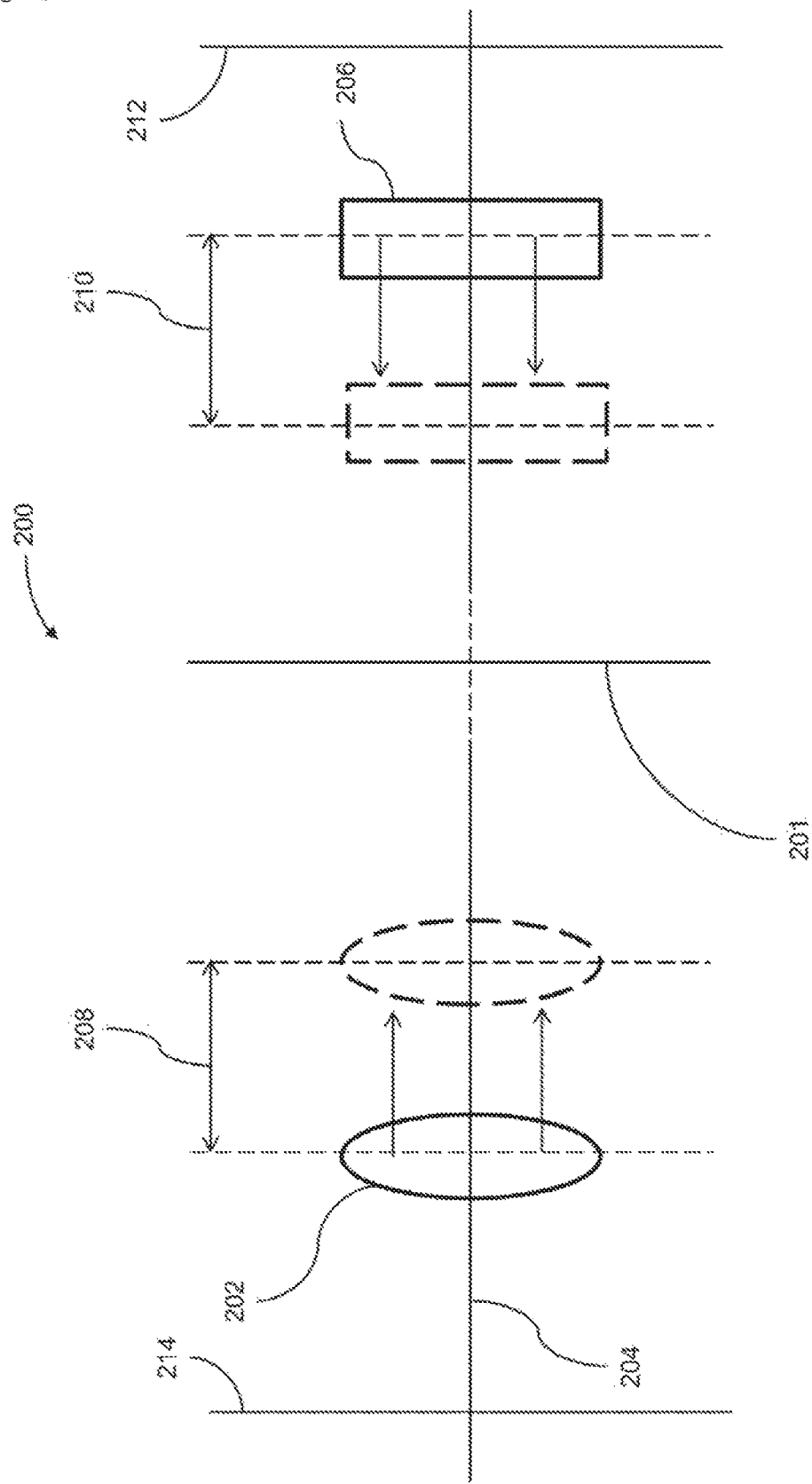

[Fig. 3]
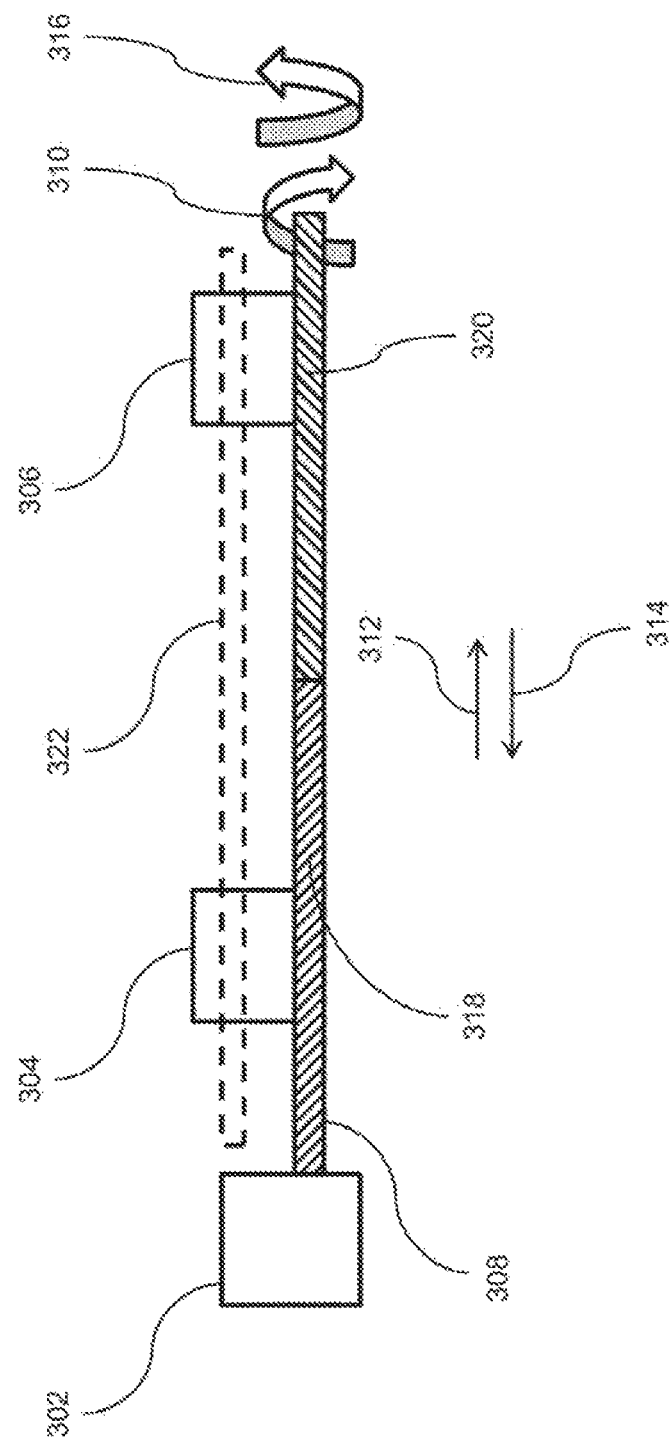

[Fig. 4]
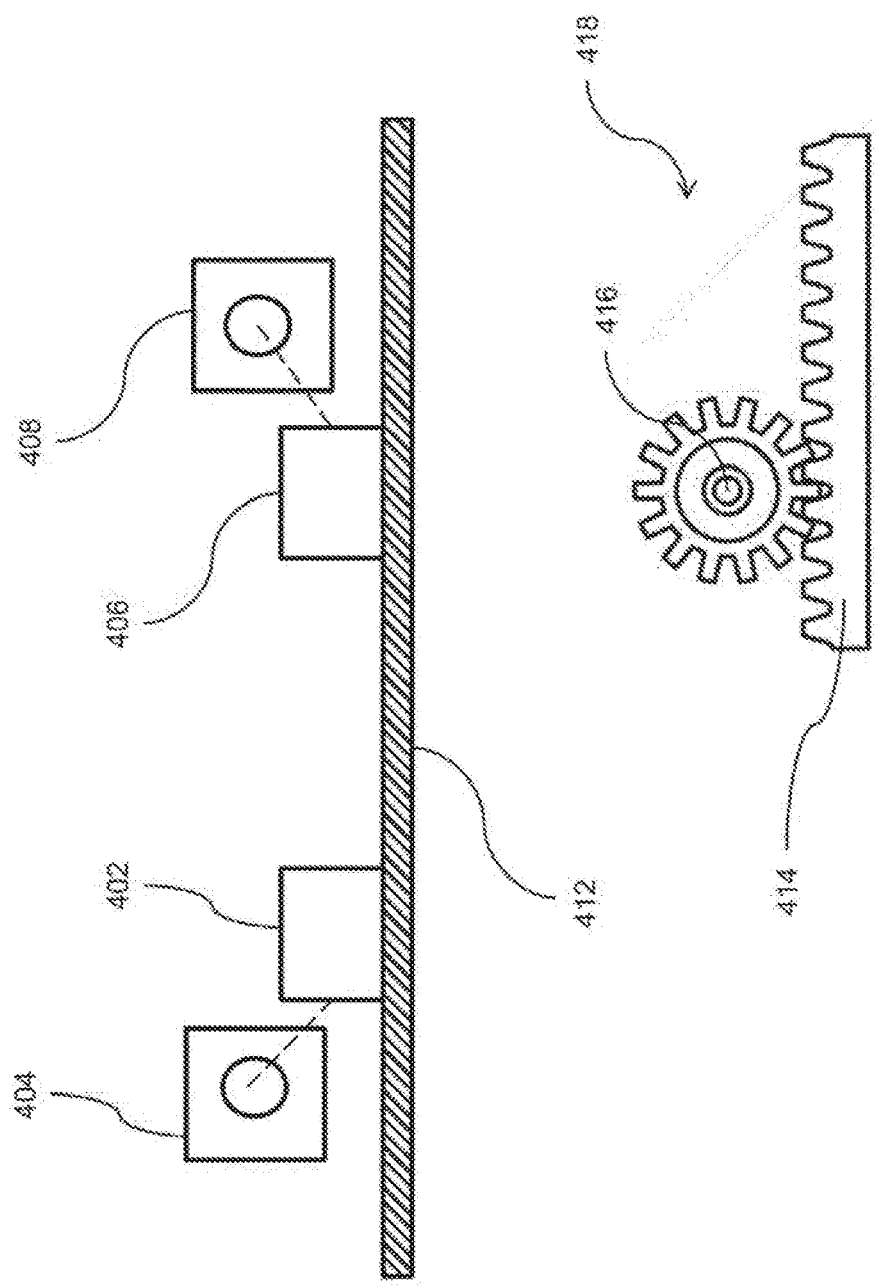

[Fig. 5]
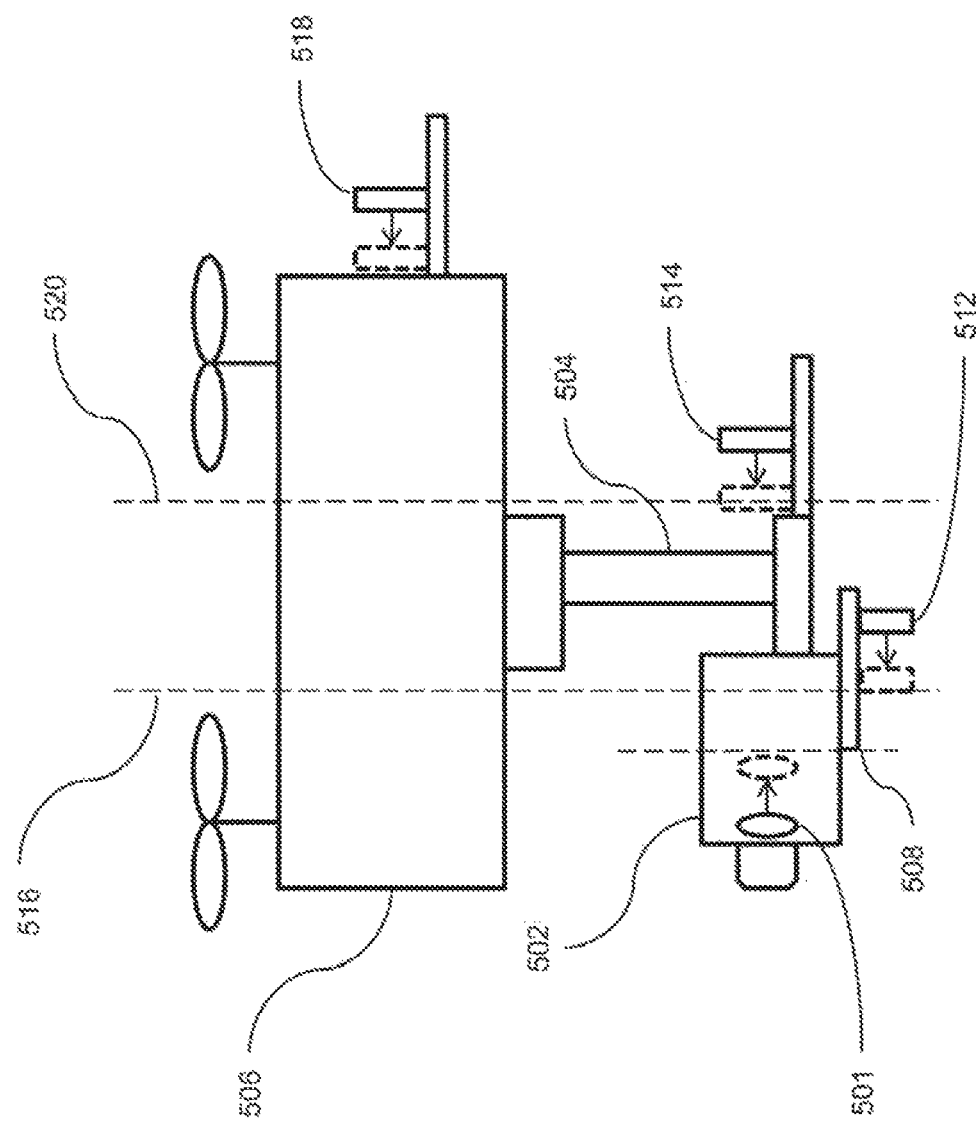

[Fig. 6]
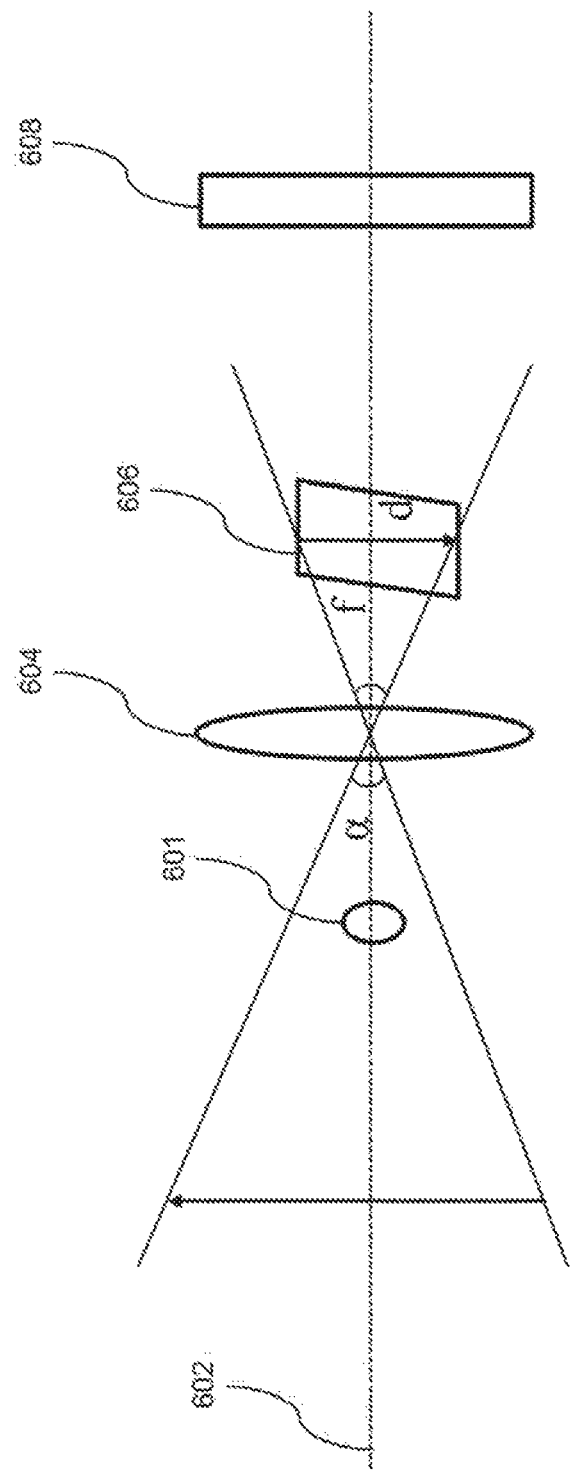

[Fig. 7]
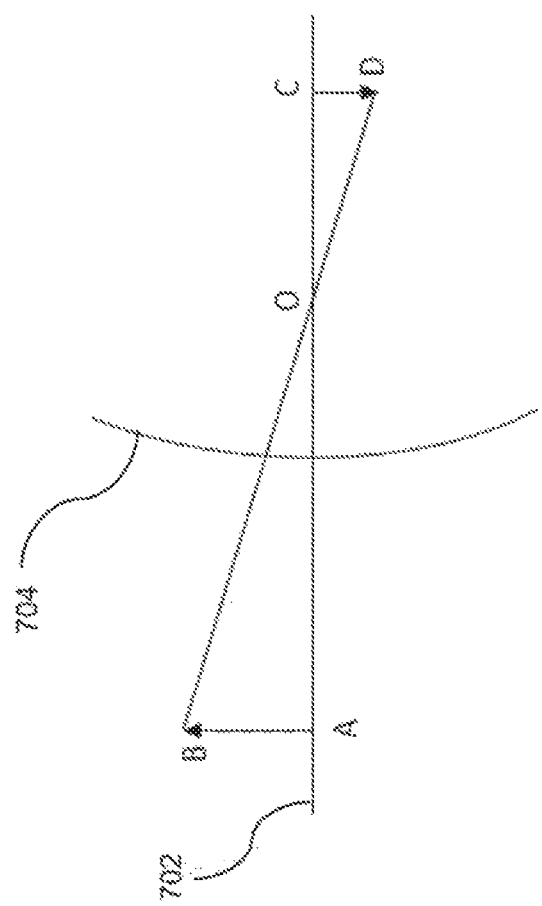

[Fig. 8]
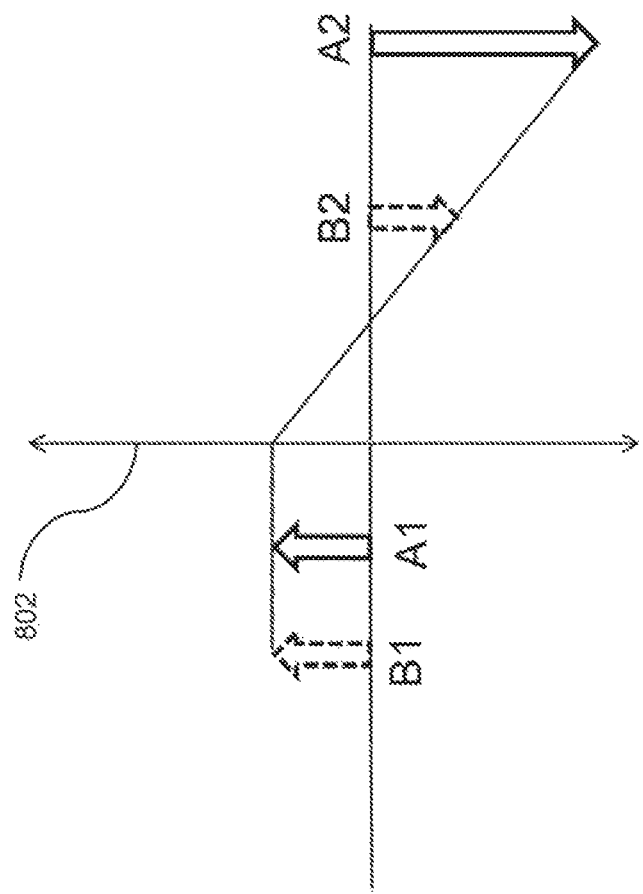

[Fig. 9]
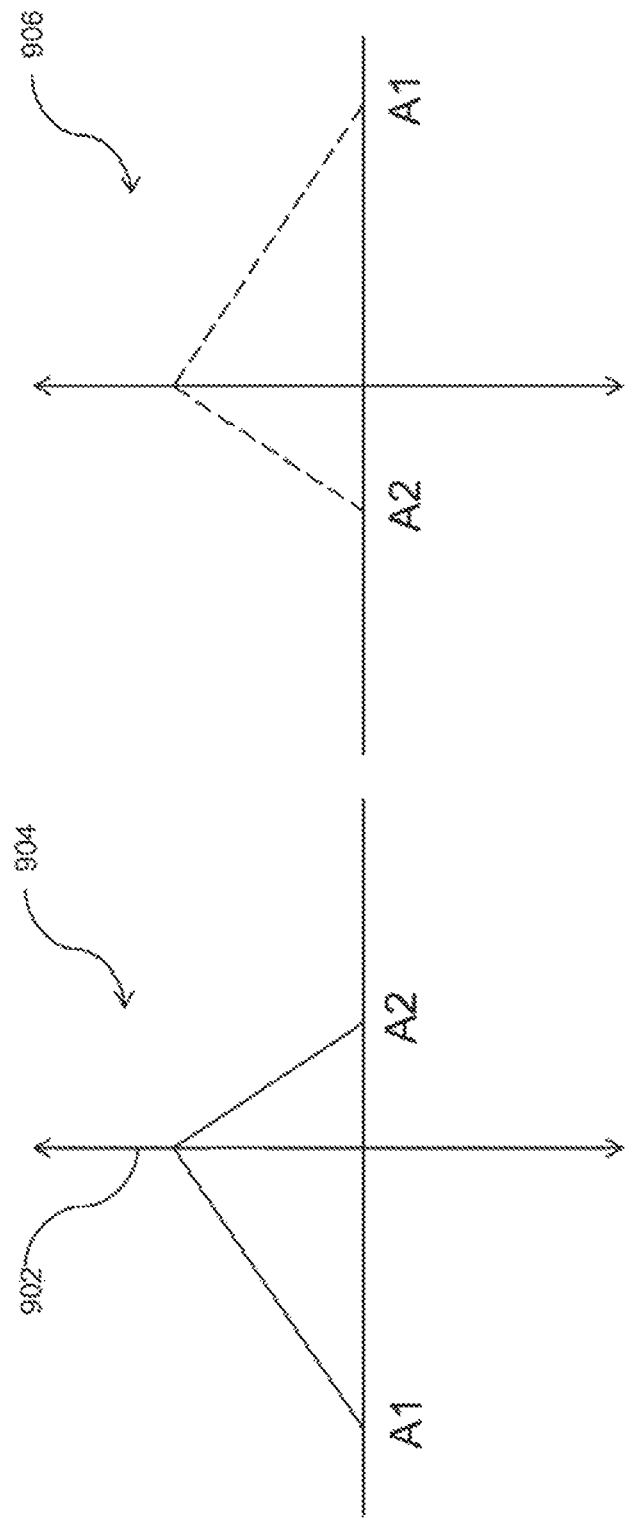

[Fig. 10]
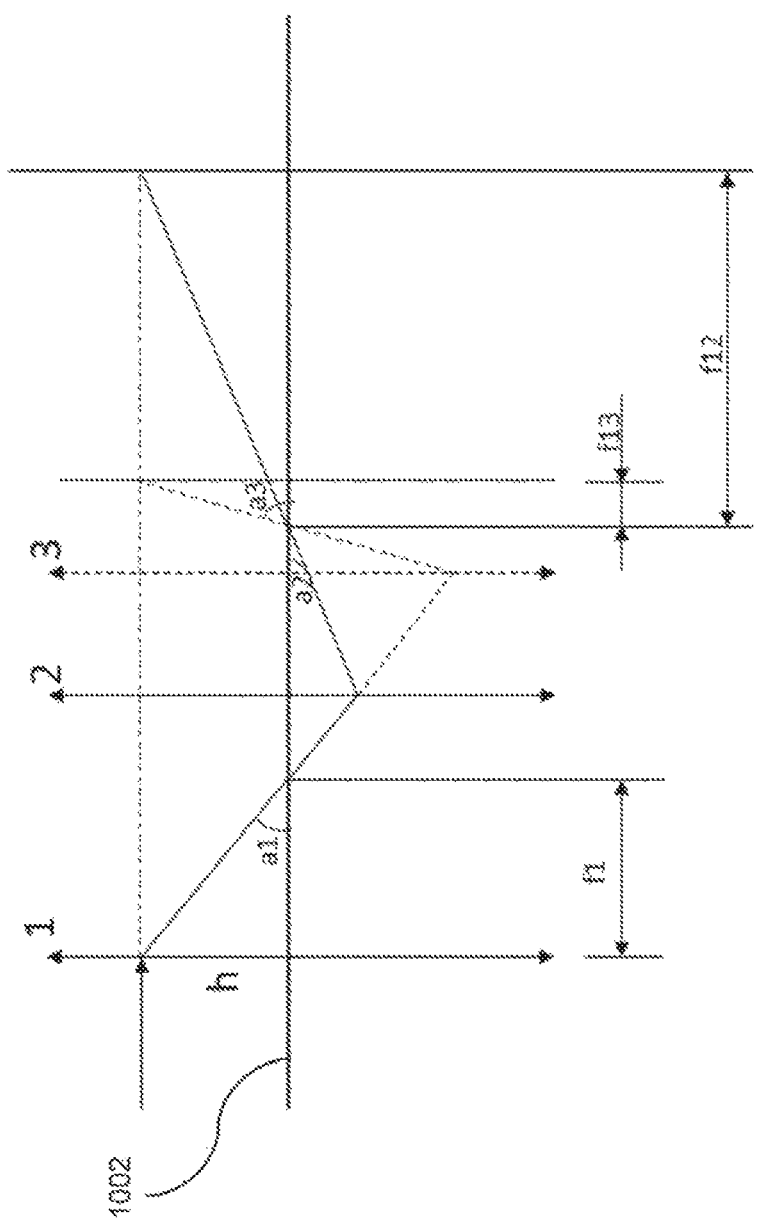

[Fig. 11]
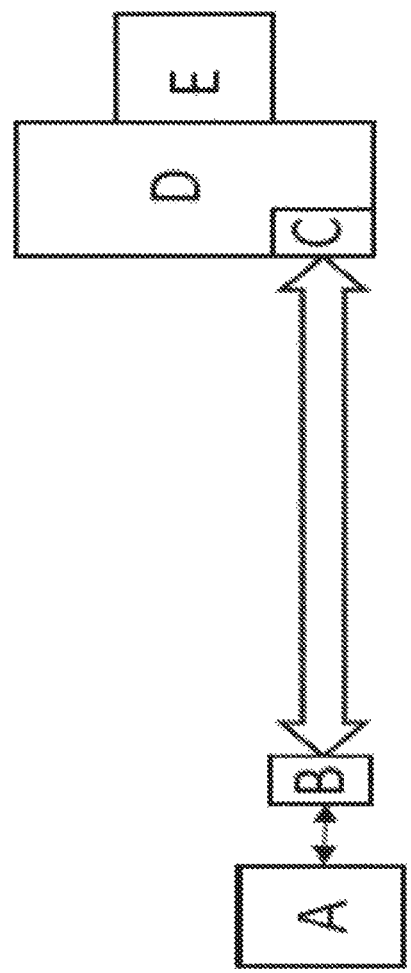

[Fig. 12]
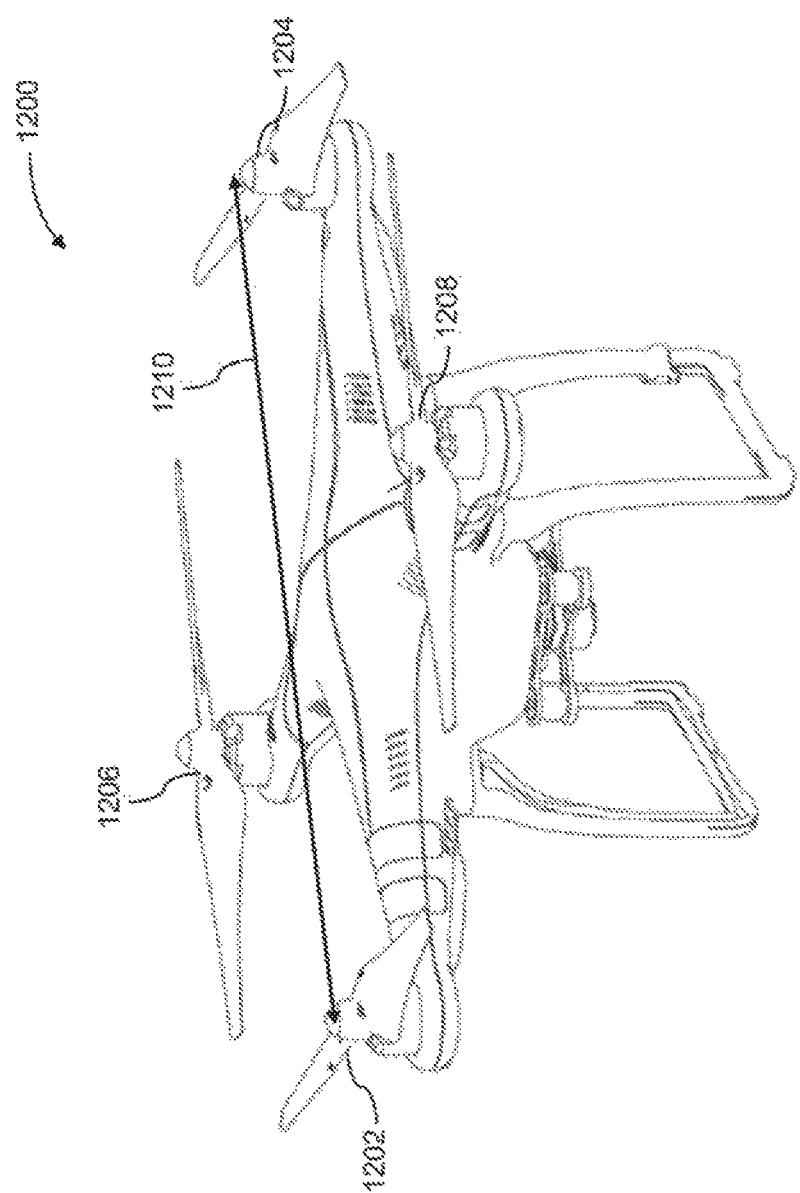

[Fig. 13]
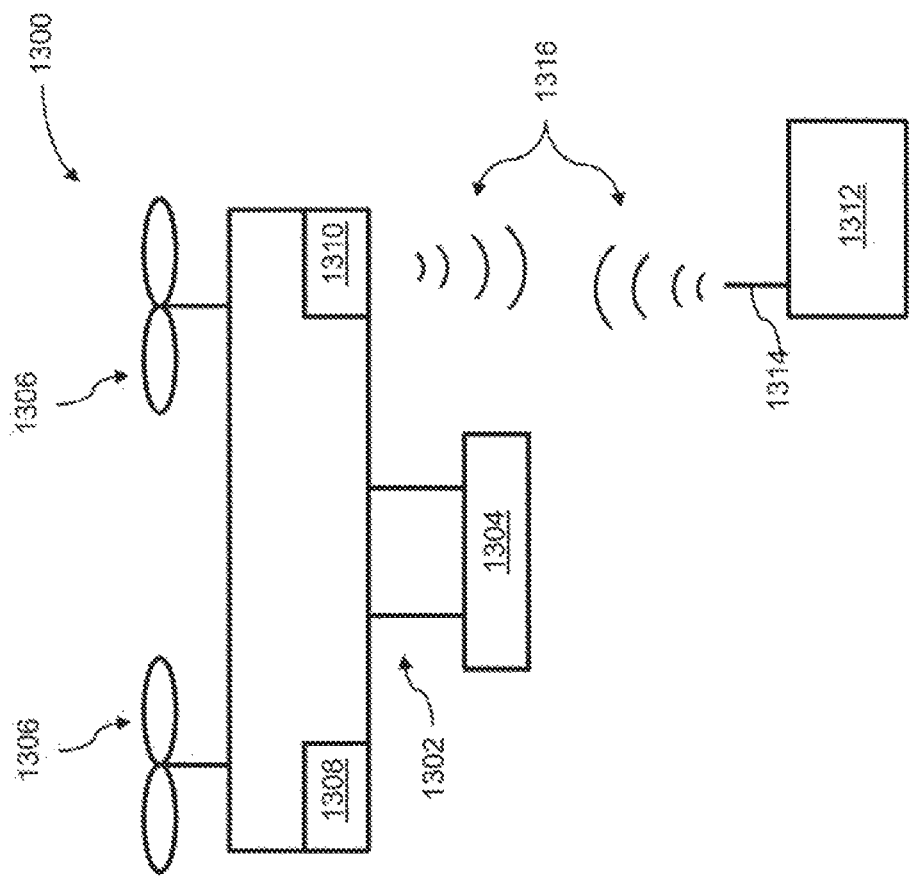

[Fig. 14]
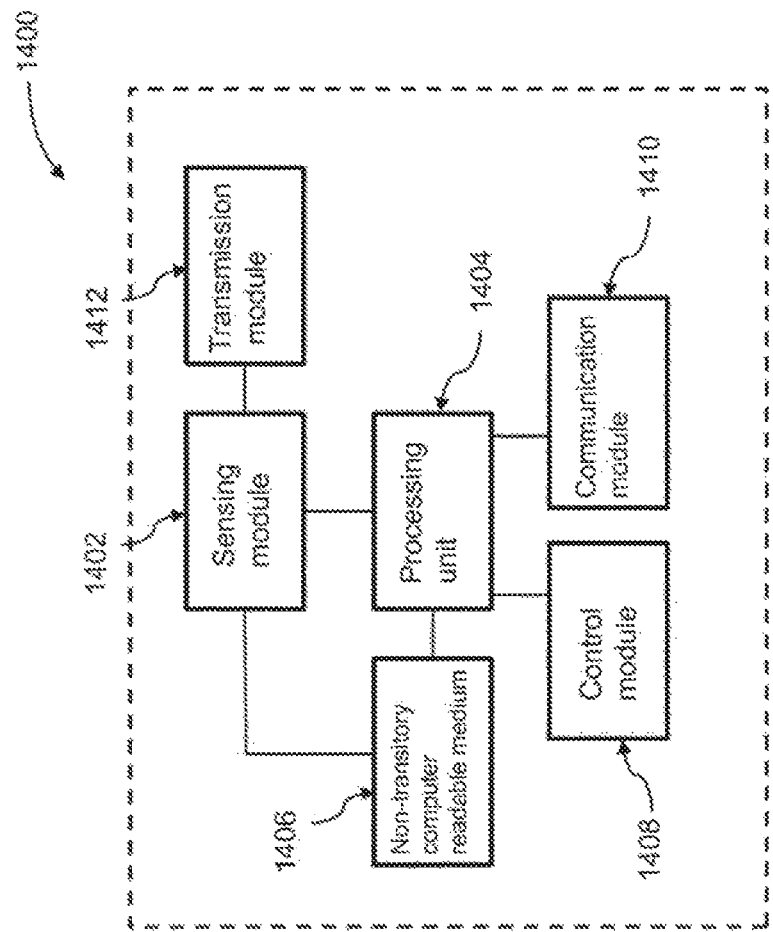

IMAGING SYSTEM

CROSS-REFERENCE TO RELATED APPLICATION

This application is a national stage entry under 35 U.S.C. § 371 of International Application No. PCT/CN2015/092748, filed on Oct. 23, 2015, the entire contents of which are incorporated herein by reference.

BACKGROUND

Imaging devices of wide ranging sizes and capabilities have been developed for a variety of applications. For example, imaging devices may be used as a stand-alone device by professional photographers or cinematographers. In some instances, imaging devices may be integrated as a component into systems having other various capabilities (e.g., smart phones, tablets). In some instances, imaging devices may be carried on board movable objects, such as unmanned aerial vehicles (UAVs), and be utilized for surveillance, search and rescue operations, exploration, and other activities.

Imaging devices may comprise an optical zooming system with movable lens elements (e.g., zoom lens). The optical zooming system may enable the imaging device to capture images of variable focal lengths, and/or magnifications. Existing approaches for implementing optical zooming systems may be less than optimal in some instances. For example, movement of the lens elements may alter a center of gravity or balance of the imaging device, which may lead to capture of unstable, shaky images or videos. In some instances, movement of the zoom lens may alter a center of gravity or balance of an imaging system, negatively affecting stability and performance of the system.

SUMMARY

Embodiments disclosed herein provide systems and methods for capturing stable images. Imaging devices may be utilized in capturing the stable images. The imaging devices may utilize one or more movable lens elements. The movable lens elements may move via external force (e.g., physical exertion), and/or via an internal motor responding to control signals. One or more counterweights may move in correspondence with, or in response to a movement of the movable lens elements. A center of gravity of the imaging device, or an imaging system, may be maintained. Advantageously, the approaches described herein may stabilize imaging devices or imaging systems comprising movable components and enable capture of high quality images.

Thus, in one aspect, an optical zooming system with a stationary center of gravity is provided. The system comprises: one or more lens elements, each configured to move along an optical axis; and one or more counterweights operably coupled to the one or more lens elements, wherein the one or more counterweights are configured to maintain a center of gravity of the optical zooming system during movement of the one or more lens elements.

In another aspect, a method of maintaining a center of gravity during an optical zoom is provided. The method comprises: providing an optical zooming system, the optical zooming system comprising (1) one or more lens elements, each configured to move along an optical axis, and (2) one or more counterweights operably coupled to the one or more lens elements; and moving the one or more lens elements, wherein the one or more counterweights maintains a center of gravity of the optical zooming system during movement of the one or more lens elements.

In another aspect, an imaging system for capturing stable images is provided. The system comprises: one or more lens elements, each configured to move along an optical axis; and one or more counterweights configured to move relative to the one or more lens elements, wherein a movement of the one or more counterweights corresponds with a movement of the one or more lens elements.

In another aspect, a method for capturing stable images is provided. The method comprises: providing an imaging system, the imaging system comprising (1) one or more lens elements, each configured to move along an optical axis, and (2) one or more counterweights configured to move relative to the one or more lens elements; moving the one or more lens elements; moving the one or more counterweights in correspondence with the movement of the one or more lens element; and capturing a stable image.

In another aspect, an optical zooming system for capturing stable images is provided. The system comprises: one or more lens elements, each configured to move along an optical axis; one or more counterweights operably coupled to the one or more lens elements; and one or more mechanical elements configured to control a movement of the one or more lens elements, and change a state of the one or more counterweights in response to the movement of the one or more lens elements.

In another aspect, a method for capturing stable images is provided. The method comprises: providing an optical zooming system, the optical zooming system comprising (1) one or more lens elements, each configured to move along an optical axis, (2) one or more counterweights operably coupled to the one or more lens elements, and (3) one or more mechanical elements configured to control a movement of the one or more lens elements, and change a state of the one or more counterweights in response to the movement of the one or more lens elements; actuating the one or more mechanical elements, thereby moving at least one of the one or more lens elements; and capturing a stable image.

It shall be understood that different aspects of the invention can be appreciated individually, collectively, or in combination with each other. Various aspects of the invention described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present invention will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWING

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 illustrates an imaging system, in accordance with embodiments.

FIG. 2 illustrates an imaging system with a stationary center of gravity, in accordance with embodiments.

FIG. 3 illustrates a movable lens element and a counterweight coupled to a common mechanical element, in accordance with embodiments.

FIG. 4 illustrates a movable lens element coupled to a first motor and a counterweight coupled to a second motor, in accordance with embodiments.

FIG. 5 illustrates one or more counterweights located outside a housing of the imaging device, in accordance with embodiments.

FIG. 6 illustrates additional components of an imaging system, in accordance with embodiments.

FIG. 7 illustrates magnification on a vertical axis.

FIG. 8 illustrates an imaging principle.

FIG. 9 illustrates an object-image exchanging principle.

FIG. 10 illustrates a zoom lens system with optical axis.

FIG. 11 illustrates a block diagram for transmission of zoom control, in accordance with embodiments.

FIG. 12 illustrates an appearance of UAV in accordance with embodiments.

FIG. 13 illustrates a movable object including a carrier and a payload, in accordance with embodiments.

FIG. 14 is a schematic illustration by way of block diagram of a system for controlling a movable object, in accordance with embodiments.

DETAILED DESCRIPTION

A need exists for imaging systems that are stable and are able to capture high quality images with varying fields of views and/or varying magnifications. An imaging system as described herein may refer to any number of components, individually or collectively, configured to capture images. For example, an imaging system may refer to an optical zooming system. The optical zooming system may comprise one or more movable lens elements. In some instances, the optical zooming system may comprise optical components necessary for generation of images (e.g., image sensors) and/or counterweights. One or more counterweights may be provided. The one or more counterweights may be configured to maintain a stability of the imaging system. In some instances, the one or more counterweights may be configured to maintain a stability of components of the imaging system.

In some instances, an imaging system may refer to an imaging device such as a camera. In some instances, an imaging system may refer to a camera coupled a carrier such as a gimbal. In some instances, an imaging system may refer to a camera coupled to a movable object (e.g., unmanned aerial vehicle, or UAV). The camera may be coupled to the movable object directly or indirectly via an intermediary (e.g., gimbal).

FIG. 1 illustrates an imaging system, in accordance with embodiments. The imaging system 100 may be configured to intake light 102 and gather image data (e.g., with an image sensor). In some instances, the imaging system may be configured to output an image 104 (e.g., on a display) based on the gathered image data. The imaging system may comprise one or more optical elements 106 and/or image sensors 108. Optical elements may aid in directing light to the image sensor. For example, the one or more optical elements may comprise one or more lens elements. A lens may be a prime lens. A prime lens may have a fixed, single focal length. A lens may be a zoom lens, with movable lens elements as further described below. While lenses are primarily described throughout as an exemplary optical element, it is to be understood that any other optical element such as mirrors, filters, gratings, additional lenses, or dichroics may be used interchangeably throughout.

An imaging system may comprise one or more sensors. For example, an imaging system may comprise a light sensor with photosites to collect and store photons. The light sensor may further convert the collected information (e.g., photons) to a digital form (e.g., capturing an image). For example, an imaging system may comprise a focusing sensor to determine a correct focus of an image that is to be captured. For example, an imaging system may comprise a balancing sensor (e.g., a white balance sensor) to balance color of a captured image (e.g., to match that of human vision). In some instances, one image sensor may comprise functions of a plurality of sensors. For example, one sensor may be used to detect and convey light into a form that conveys an image (e.g., capture an image) as well as focus and balance the image (e.g., white balance). An image processor 110 may process the captured images and perform image processing functions such as black level correction, surrounding light ratio correction, distortion correction, white balance correction, color crosstalk correction, demosaic, color correction, gray scale mapping, color space conversion, sharpening, and noise removal to generate an image for viewing.

The imaging system may comprise one or more counterweights 118. The one or more counterweights may be configured to maintain a stability of the imaging system (or components of the imaging system). For example, the one or more counterweights may be configured to maintain a center of gravity or a center of mass of the imaging system. In some instances, the one or more counterweights may be configured to minimize an instability of the imaging system (e.g., components of the imaging system) but not perfectly maintain the stability. For example, the one or more counterweights may counteract, or minimize a change in a center of gravity or a center of mass of an imaging system, but not perfectly prevent the change.

In some instances, the center of gravity or the center of mass of an imaging system may be maintained about one dimension, two dimensions, or three dimensions with aid of the one or more counterweights. In some instances, the center of gravity or the center of mass of an imaging system may be maintained about one, two, three, four, five directions or more with the aid of one or more counterweights. In some instances, a center of gravity of an imaging system may be maintained within a distance equal or less than about 0.01 cm, 0.02 cm, 0.03 cm, 0.05 cm, 0.1 cm, 0.12 cm, 0.15 cm, 0.3 cm, 0.5 cm, 1 cm, 2 cm, 5 cm, 10 cm, or 20 cm with aid of the one or more counterweights.

In some instances, the one or more counterweights may be operably coupled to one or more optical elements. In some instances, the one or more counterweights may be operably coupled to the one or more lens elements. In some instances, the one or more counterweights may be operably coupled to any movable component of the imaging system. Alternatively or in addition, the one or more counterweights may be operably coupled elsewhere, e.g., to an external housing of the imaging system or to other components of the imaging system.

An imaging system as described herein may comprise movable parts, or components configured to move. The moving parts may be, for example, movable lens elements (e.g., zoom lens), counterweights, motors, or mechanical structures (e.g., threaded rods, frame components, etc). In many instances, it may be desirable to provide imaging systems with a zoom capability to capture images of an environment far away from the imaging systems. In some instances, an optical zooming system (e.g., comprising a zoom lens) may be desired as it may be useful in capturing (e.g., generating) high quality images using imaging systems.

An optical zooming system may enlarge an image with the aid of a set of optical lenses (e.g., zoom lens). A zoom lens may have variable focal lengths and the focal length may encompass a plurality of focal lengths (e.g., focal length range). An optical zoom lens may vary the focal length by a relative movement of a set of internal lens elements. However, imaging devices having a zoom lens that cover a wide zoom range may be large in size and heavy in weight. Accordingly, movement of one or more lenses of a zoom lens may affect a center of gravity of the imaging system which may lead to instability and overall decrease in performance of the system. In some instances, movement of one or more lens elements may prevent capture of smooth videos and/or result in undesired change in field of view which must be corrected.

In some instances, it may be beneficial for the imaging system to remain stable when components of the imaging system are in motion. For example, a stable center of gravity or mass may be maintained when components of the imaging system are in motion. For example, when movable lens elements are moving, the imaging system may comprise a set of counterweights configured to maintain a center of gravity of the imaging system. In some instances, when movable lens elements are moving, a set of counterweights may move in correspondence with the lens elements and maintain a stability of the imaging system. Because stability (e.g., center of gravity) of the imaging system is maintained despite movement of internal components, the imaging system may be able to capture high quality, stable images in a variety of conditions, over a prolonged period of time, without wasted resources. For example, for an imaging of the present disclosure coupled to a UAV (e.g., through a carrier), a center of gravity may be maintained during an optical zooming process. Accordingly stable, high quality images may be captured without need for compensatory adjustment on the part of the UAV and/or the carrier, leading to greater efficiency and performance of the imaging system.

The imaging system may further comprise a communication unit and/or storage unit. A communication unit may be used for communication with external components and/or devices, e.g., mobile devices such as mobile phones, tablets, PCs, remote controllers, etc. The communication unit, for example, may be used in sending images captured by the imaging system (e.g., output), or receiving inputs (e.g., control signals) from the external components or devices. The communication unit may also be used to transform images via digital signal processing (DSP) to improve captured images (e.g., by the image sensor) in some way. The storage unit may be used for temporarily or permanently storing image(s) captured by the imaging system.

FIG. 2 illustrates an imaging system 200 with a stationary center of gravity 201, in accordance with embodiments. In some instances, the imaging system may be all enclosed in a single housing. For example, the imaging system may refer to an imaging device such as a camera with a housing. In some instances, only parts of the imaging system may be enclosed in a housing. For example, one or more optical elements (e.g., lens element 202) may be enclosed in a housing of an imaging device while one or more counterweights 206 are located outside the housing. For example, one or more optical elements may be enclosed in a housing of an imaging device while one or more counterweights are located, or coupled to a carrier. In some instances, parts of the imaging system may be enclosed in a first housing while other parts of the imaging system may be enclosed in a different housing. For example, one or more optical elements may be enclosed in a housing of an imaging device while one or more counterweights are located within their own housing. For example, one or more optical elements may be enclosed in a housing of an imaging device while one or more counterweights are located within a housing of a carrier (e.g., gimbal) and/or a movable object (e.g., UAV). In some instances, the one or more lens elements and the one or more counterweights may be enclosed in a housing that is equal to or less than about 8 in3, 27 in3, 64 in3, 125 in3, 216 in3, 343 in3, 512 in3, 729 in3, 1000 in3, or 1500 in3.

The housing may be substantially fluid-tight. The housing may be air-tight. The housing may be formed from a substantially opaque material, translucent material, or transparent material. The housing may prevent unwanted light from entering the housing. The housing may limit light reaching the optical modules to one or more controlled entrances. The housing may be light-tight, except for a single aperture located on the housing. In some instances, the imaging system may be, for example, a camera. In some instances, the imaging system may comprise a plurality of discrete parts (e.g., devices) working together. For example, the imaging system may comprise two or more cameras and other optical elements working in conjunction. In some instances, the imaging system may comprise cameras and external components or devices coupled to the camera (e.g., carriers, movable objects, etc).

The imaging system may comprise an optical zooming system, e.g., with a zoom lens. The imaging system may comprise lens element 202 configured to move along an optical axis 204. The lens element may move in a direction towards the center of gravity along the optical axis. Alternatively, the lens element may move in a direction away from the center of gravity along the optical axis. In some instances, the lens element may move along a path different from its optical axis. For example, the lens element may move perpendicular, or at an angle with respect to its optical axis. In some instances, the optical element may rotate about a fixed axis.

While FIG. 2 shows a single lens element, it is to be understood that the imaging system may comprise about 1, 2, 3, 4, 5, 6, 7, 8, 9, 10, 12, 15, 20, or 30 or more lens elements. Each of the various lens elements may have the same size, shape, or weight. Each of the various lens elements may have different sizes, shapes, or weights. Each of the lens elements may be configured to move. Alternatively, some of the lens elements may be stationary (e.g., prime lenses) while other lens elements are configured to move. Each of the movable lens elements may be configured to move individually, or in concert with other lens elements. A plurality of lens elements may or may not align along a single optical axis. In some instances, the plurality of lens elements may substantially align along a single optical axis. Movement of the one or more movable lens elements of the imaging system may alter a magnification, focus, and/or a focal length of the imaging system, as previously described.

The one or more lens elements of an imaging system may also be referred to collectively as a lens module, and the two phrases may be used interchangeably herein. In some instances, a lens module may comprise a plurality of lens sharing the same optical axis. In some instances, the one or more lens elements of an imaging system may refer to a group of lenses sharing a common functionality. For example, the one or more lens elements may refer to lenses of a focusing group, master group, compensator group, variator group, etc. For example, the focusing group may focus a lens. For example, the variator group may change a focal length of the lens. For example, the compensator group may maintain a focus and change a focal length of the lens. For example, the master group may relay variable magnifications to the focal plane of the imaging system.

The imaging system may comprise one or more counterweights 206. The one or more counterweights may be operably coupled to the one or more lens elements. In some instances, the one or more counterweights may be operably coupled one or more lenses within the lens module. In some instances, the one or more counterweights may be operably coupled to one or more groups within the lens module (e.g., focusing group). Alternatively or in addition, the one or more counterweights may be operably coupled to any other components of the imaging system as previously described herein, e.g., any other optical element, any movable component, any component that is configured to move along a single axis, etc. In some instances, the one or more counterweights may be located along the optical axis 204. In some instances, the one or more counterweights may be located along the optical axis, but on an opposite side of the center of gravity 201 comparatively to the one or more lens elements. In some instances, the one or more counterweights may be located along the optical axis, and on a same as the one or more lens elements compared to a center of gravity (e.g., if the center of gravity is 214 or 212 as shown in FIG. 2).

In some instances, there may be a single counterweight operably coupled to a plurality of lens elements (e.g., lens module) configured to move. In some instances, there may be a distinct counterweight operably coupled to each of the lens elements configured to move (e.g., 1:1 ratio). In some instances, there may be a corresponding counterweight for each lens module. In some instances, there may be a corresponding counterweight a number of optical axes within the imaging system. For example, if the one or more lens elements are configured to move about a single optical axis, there may be a single corresponding counterweight. If the one or more lens elements are configured to move about two, three, four, five or more optical axes, there may be two, three, four, five or more counterweights corresponding to the number of optical axes. The number of counterweights within an imaging system may be equal to or greater than about 1, 2, 3, 4, 5, 6, 7, 8, 9, 10, 12, 15, 20, or 30. The number of counterweights may or may not correspond to a number of lens elements of the imaging system. The number of counterweights may or may not correspond to a number of lens modules of the imaging system. The number of counterweights may or may not correspond to a number of zoom lens of the imaging system. A zoom lens as described herein may refer to a plurality of lens elements coupled together and configured to vary a focal length of the imaging system.

A weight of the one or more counterweights may be equal to, or greater than about 10%, 25%, 50%, 75%, 100%, 125%, 150%, 200%, or 300% of a weight of one or more lens elements. A collective weight of the one or more counterweights may be equal to or greater than about 10%, 25%, 50%, 75%, 100%, 125%, 150%, 200%, or 300% of a collective weight of the one or more lens elements. A weight of each of the one or more counterweights may be equal to or greater than about 10%, 25%, 50%, 75%, 100%, 125%, 150%, 200%, or 300% of a weight of a corresponding lens element (e.g., a lens element or lens module to which it is operably coupled to). In some instances, a weight of the one or more counterweights may be equal to a weight of the one or more lens elements. In some instances, a weight of the one or more counterweights may be different from a weight of the one or more lens elements.

A size of the one or more counterweights may be equal to or greater than about 10%, 25%, 50%, 75%, 100%, 125%, 150%, 200%, or 300% of a size of one or more lens elements. A collective size of the one or more counterweights may be equal to or greater than about 10%, 25%, 50%, 75%, 100%, 125%, 150%, 200%, or 300% of a collective size of the one or more lens elements. A size of each of the one or more counterweights may be equal to or greater than about 10%, 25%, 50%, 75%, 100%, 125%, 150%, 200%, or 300% of a size of a corresponding lens element (e.g., a lens element or lens module to which it is operably coupled to). In some instances, a size of the one or more counterweights may be equal to a size of the one or more lens elements. In some instances, a size of the one or more counterweights may be different from a size of the one or more lens elements. A size of an object (e.g., one or more counterweights or lens elements) as used herein may refer to a height, width, length, minimum dimension, maximum dimension, surface area, or volume of the object.

The one or more counterweights may have a similar shape as the one or more lens elements. The one or more counterweights may have a dissimilar shape from the one or more lens elements. In some instances, the one or more counterweights may have a cubic shape, rectangular shape, oval shape, or spherical shape. The one or more counterweights may be adjustable. The one or more counterweights may be deformable. In some instances, a state of the one or more counterweights may be varied in order to maintain a stability of the imaging system. For example, the one or more counterweights may be fillable (e.g., with sand, liquid, etc) such that weight of the counterweight may be increased or decreased. For example, the one or more counterweights may comprise a hollow means into which material may be added (e.g., sand, liquid). In some instances, a distribution of weight within the counterweight may change, e.g., change in correspondence or in response to a movement of one or more lens elements. In some instances, the one or more counterweights may comprise parts that may be connected or disconnected such that a weight of the counterweight may be increased or decreased. In some instances, an orientation of the one or more counterweights may be adjustable. The state of the one or more counterweights may be varied in correspondence with, or in response to movement of movable part (e.g., one or more lens elements) within the imaging system. In some instances, the one or more counterweights may not be adjustable. The one or more counterweights may be made of any material, e.g., metal, rubber, etc.

The one or more counterweights may be configured to maintain a stability of the imaging system. For example, the one or more counterweights may be configured to maintain a center of gravity or a center of mass of the imaging system. The one or more counterweights may be configured to minimize instability of the imaging system, as previously described herein. In some instances, the one or more counterweights may be configured to maintain a stability (e.g., center of gravity) of the imaging system during movement of the one or more movable lens elements.

In some instances, the one of more counterweights may be utilized in a method of maintaining a center of gravity during an optical zoom. In a first step, an imaging system may be provided. In some instances, the imaging system may comprise one or more lens elements and one or more counterweights operably coupled to the one or more lens elements. The one or more lens elements and the one or more counterweights may be substantially as described herein. For example, the one or more optical elements may be configured to move along the optical axis. In a second step, the one or more lens elements may be move (e.g., in response to a control signal, in response to external force, due to actuation of motors, etc), and the one or more counterweights may maintain a center of gravity of the optical zooming system during movement of the one or more lens elements. Maintenance of a center of gravity may provide an ability to capture high quality stable images (e.g., a sequence of images, video, etc).

The one or more counterweights may be configured to move. The one or more counterweights may be configured to move in correspondence with a movement of the one or more lens elements. A movement of the one or more counterweights may be along the optical axis 204 (e.g., of the one or more lens elements). A movement of the one or more counterweights may be substantially along the optical axis. In some instances, a movement of the one or more counterweights may be parallel to the optical axis of the one or more lens elements. In some instances, a movement of the one or more counterweights may be parallel to a movement of the one or more lens elements, which may or may not be along the optical axis. In some instances, a movement of the one or more counterweights may be neither along the optical axis nor parallel to the optical axis, e.g., along an axis that intersects with the optical axis at a single point.

The movement of the one or more counterweights may maintain a stability of the imaging system. The movement of the one or more counterweights may be in a direction opposing movement of other components of the imaging system. In some instances, the movement of the one or more counterweights may be in a direction opposite to the movement of the one or more lens elements. For example, if the lens element 202 moves in a direction towards the center of gravity 201, the one or more counterweights may move in a direction towards the center of gravity, thereby maintaining a stability (e.g., center of gravity) of the imaging system. Similarly, if the lens element moves in a direction away from the center of gravity, the one or more counterweights may move away from the center of gravity, thereby maintaining a stability. In some instances, the lens element may move in a direction towards the center of gravity while the one or more counterweights may move in a direction away from the center of gravity, or vice versa (e.g., if the center of gravity was located at 212, 214). In some instances, a movement of the one or more counterweights is equidistant to the movement of the one or more lens elements. For example, lens element 202 may move a distance 208 towards the center of gravity, and the counterweight 206 may move a distance 210 equal to distance 208 towards the center of gravity. In some cases, a distance moved by the counterweight may depend on a ratio of a weight of the one or more lens elements to the one or more counterweights. In some instances, the one or more counterweights may be configured to move a distance such that a center of gravity of the imaging system is maintained.

The one or more counterweights may be configured to move simultaneously with the one or more lens elements. For example, a single mechanism (e.g., single motor, single threaded rod, etc) may control a movement of both the one or more lens elements and the one or more counterweights. In some instances, a movement of the one or more lens elements and/or one or more counterweights may be driven by an external force (e.g., physical exertion by a human being, motor external to the imaging system, etc). In some instances, separate mechanisms may control a movement of the one or more lens elements and a movement of the one or more counterweights. For example, the movement of the one or more lens elements may be driven by a first motor while a movement of the one or more counterweights may be driven by a second motor. In some instances, a single control signal may actuate movement of both the one or more lens elements and a movement of the one or more counterweights. In some instances, different control signals may actuate movement of the one or more lens elements and a movement of the one or more counterweights.

In some instances, the one or more counterweighs may be configured to move in response to a stimuli. For example, the imaging system may be configured to detect movement (e.g., translational movement) of one or more components within the imaging system. In some instances, actuation of a motor (e.g., configured to move one or more lens elements) may be detected. In some instances, data regarding the change may be received from one or more sensors, e.g., inertial sensors, accelerometers, Hall effect sensor, etc. A processor may receive the data and generate a control signal configured to move the one or more counterweights in response. The detection and processing may happen in real time. The detection and processing may happen substantially in real time, e.g., with minimal delay.

The imaging system may comprise one or more motors configured to drive the movement of the one or more lens elements and a movement of the one or more counterweights. A motor as used herein may refer to a focusing motor and/or a zoom motor. Different motors may be operably coupled to different lens groups of a lens module. In some instances, a single motor may drive both the movement of the one or more lens elements and the movement of the one or more counterweights. For example, actuation of the single motor may affect movement of the one or more lens elements in a first direction and a movement of the one or more counterweights in a second direction different from the first direction. In some instances, the first direction and the second direction may be opposite directions. In some instances, the rotation of the motor drives the movement of the one or more lens elements and the movement of the one or more counterweights by an equal amount (e.g., equal distance).

In some instances, a first motor may drive a movement of the one or more lens elements while a second motor drives a movement of the one or more counterweights. The different motors may be driven in correspondence such that a movement of the one or more lens elements corresponds with a movement of the one or more counterweights. In some instances, a single control signal may actuate movement (e.g., rotation) of the different motors. While translational movement of the one or more lens elements and the one or more counterweights have been described primarily herein, it is to be understood that the movement of the one or more lens elements and/or the one or more counterweights may comprise rotational movement (e.g., about a pitch, yaw, and/or roll axis). For example, in response to, or in correspondence with translational movement of the one or more lens elements, the one or more counterweights may make a rotational movement about an axis and change an orientation, thereby maintaining a stability of the system. For example, in response to, or in correspondence with rotational movement of the one or more lens elements, the one or more counterweights may make a rotational movement, thereby maintaining a stability of the system. Additional types of movement may comprise movement that involve both translation and rotation (e.g., swinging movement).

In some instances, the one or more counterweights may be utilized in a method for capturing stable images. In a first step, an imaging system may be provided. The imaging system may comprise one or more lens elements and one or more counterweights. The one or more lens elements and the one or more counterweights may be substantially as described herein. For example, the one or more lens elements may be configured to each move along an optical axis, and the one or more counterweights may be configured to move relative to the one or more lens elements. In a second step the one or more lens elements may be moved (e.g., in response to a control signal, in response to external force, due to actuation of motors, etc). In a third step, the one or more counterweights may be moved in correspondence with, or in response to, the movement of the one or more lens element. In a fourth step, a stable image may be captured. The stable image may be captured as a result of the concerted movement of the one or more lens elements and the one or more counterweights.

In some instances, the one or more lens elements and the one or more counterweights are coupled to at least a common mechanical element. FIG. 3 illustrates a movable lens element 304 and a counterweight 306 coupled to a common mechanical element 308, in accordance with embodiments. The one or more counterweights and the one or more lens elements may be coupled to the mechanical element directly. Alternatively, the one or more counterweights and the one or more lens elements may be coupled to the mechanical element via an intermediary such as a frame element (e.g., moving frame element). In some instances, the common mechanical element is a motor 302. In some instances, the common mechanical element is a threaded rod. The one or more lens elements and the one the one or more counterweights may be situated on, or be coupled to, different threads of the threaded rod. For example thread 318 and thread 320 show differing threads on the threaded rod. In some instances, the threaded rod may comprise multiple regions of different threads. In some instances, the threaded rod may have threads in opposing directions. Rotation 310 of the threaded rod may drive movement of the one or more lens elements in a first direction 312 and movement of the one or more counterweights in a second direction 314 along the threaded rod. Rotation 316 of the threaded rod may drive movement of the one or more lens elements in the second direction 314 and movement of the one or more counterweights in the first direction 312 along the threaded rod. Rotation of the threaded rob may be driven by the motor 302. In some instances, a single motor may drive a movement of the one or more lens elements and the one or more counterweights simultaneously. In some instances, different motors may drive a movement of the one or more lens elements and the one or more counterweights as described elsewhere.

The movement of the one or more lens elements and the one or more counterweights may be a translational movement. In some instances, the movement of the one or more lens elements and the one or more counterweights may comprise a rotational component. In some instances, a guiding means may be provided for the one or more counterweight and/or the one or more lens elements. The guiding means may minimize or prevent undesired movement (e.g., rotational movement) of the one or more lens elements. The guiding means may minimize or prevent undesired movement (e.g., rotational movement) of the one or more counterweights. In some instances, the guiding means may comprise a guiding rod 322. In some instances, the guiding rod may penetrate through a non-optical portion of the one or more lens elements and/or the one or more counterweights. In some instances, the guiding means may comprise a grove along which the one or more lens elements and/or the one or more counterweights may slide along.

In some instances, the imaging system may comprise one or more mechanical elements configured to (1) control a movement of one or more lens elements configured to move along an optical axis, and (2) change a state of one or more counterweights in response to the movement of the one or more lens elements. In some instances, the state of the one or more counterweights is a position of the one or more counterweights. The position may be relative to the optical axis. In some instances, the state of the one or more counterweights is a weight of the one or more counterweights. For example, liquid or any other type of material (e.g., sand, metal, etc) may be added to the one or more counterweights such that a weight of the one or more counterweights is varied in order to maintain a stability of the imaging system. In some instances, the state of the one or more counterweights is an orientation of the one or more counterweights, e.g., relative to an optical axis. A change in orientation of the one or more counterweights may vary a center of gravity of the one or more counterweights. In some instances, the state of the one or more counterweights is a distribution of weight within the one or more counterweights. For example, the one or more counterweights may be configured to redistribute a weight in correspondence with, or in response to movement of the one or more lens elements, thereby maintaining a stability of the imaging system.

In some instances, the one or more counterweights may be utilized in a method for capturing stable images. In a first step, an imaging system is provided. The imaging system may comprise one or more lens elements, one or more counterweights, and one or more mechanical elements. The one or more lens elements, the one or more counterweights, and the one or more mechanical elements may be substantially as described herein. For example, the one or more lens elements may be configured to each move along an optical axis. For example, the one or more counterweights may be operably coupled to the one or more lens elements. For example, the one or more mechanical elements may be configured to control a movement of the one or more lens elements, and change a state of the one or more counterweights in response to the movement of the one or more lens elements. The state of the one or more counterweights may refer to a position, weight, orientation of the counterweight, etc, substantially as described elsewhere. In a second step, the one or more mechanical elements may be actuated, thereby moving at least one of the one or more lens elements. In a third step, a stable image may be captured. The stable image may be captured as a result of the change in state of the one or more counterweights in response to the movement of the one or more lens elements.

In some instances, the zoom lens (e.g., movable lens elements) and the one or more counterweights are located on board an imaging device, e.g., a camera. In some instances the zoom lens and the one or more counterweights are fully contained within a housing of the imaging device. Alternatively, the one or more counterweights are located outside a housing of the imaging device.

FIG. 4 illustrates a movable lens element 402 coupled to a first motor 404 and a counterweight 406 coupled to a second motor 408, in accordance with embodiments. In some instances, the one or more counterweights and/or the one or more lens elements may be configured to move along a teethed track 412. A teethed track may refer to a track 414 along which a gear 416 may move as illustrated in reference 418. In some instances, the first and second motor may drive a movement of the movable lens element and the counterweight along the teethed track. In some instances, the first and second motor may drive a movement of the movable lens element and the counterweight along the teethed track in opposite directions, substantially as described herein. In some instances, the one or more counterweights and/or the one or more lens elements may be configured to directly move along the teethed track. In some instances, the one or more counterweights and/or the one or more lens elements may be coupled to an intermediary (e.g., gears, frame components, etc) configured to move along the teethed track. The movement of the one or more counterweights and the one or more lens elements may be along a single axis. The movement of the one or more counterweights and the one or more lens elements may be substantially along a single axis. The movement of the one or more counterweights and the one or more lens elements may be along a parallel axes. In some instances, the one or more counterweights and the one or more lens elements may move along a single teethed tracks. In some instances, the one or more counterweights and the one or more lens elements may move along different teethed tracks.

FIG. 5 illustrates one or more counterweights located outside a housing of the imaging device, in accordance with embodiments. In some instances, an imaging device 502 is coupled to a carrier 504, e.g., a gimbal. In some instances, the imaging device is coupled to a movable object such as a UAV 506. In some instances, the imaging device is coupled to the UAV via the carrier. The one or more counterweights may be configured to maintain a stability of an imaging system. For example, the one or more counterweights 512 may be coupled to a housing of the imaging device and may move in correspondence with a movement of the zoom lens 501 to maintain a center of gravity 508 of an imaging system comprising the imaging device. While one possible position of the counterweight 512 is illustrated, it is to be understood that the counterweight may be located elsewhere (e.g., on top of, on a side of, behind, in-front of, below the imaging device, etc). Moreover, while a single orientation and movement of the counterweight is illustrated (e.g., parallel movement to a movement of the optical axis), it is to be understood that the counterweight may move along any direction or orientation as previously described (e.g., along the optical axis, perpendicular to the optical axis, rotationally about an axis, at an angle to the optical axis, etc).

Alternatively or in addition, one or more counterweights 514 may be coupled to a carrier. The zoom lens (e.g., one or more lens elements) may be coupled to the carrier at a first location (e.g., via the housing of the imaging device) and the one or more counterweights may be coupled to the carrier at a second location. The one or more counterweights may move in correspondence with a movement of the zoom lens to maintain a stability of an imaging system comprising the imaging device and the carrier. For example, a movement of the one or more counterweights may correspond with a movement of the zoom lens, and a center of gravity 516 of the imaging system (e.g., comprising the imaging device and the carrier) may be maintained. While one possible position of the counterweight 514 is illustrated, it is to be understood that the counterweight may be located elsewhere (e.g., on top of, on a side of, behind, in-front of, below the carrier, elsewhere on the carrier, contained within the carrier, etc). Moreover, while a single orientation and movement of the counterweight is illustrated (e.g., along the optical axis), it is to be understood that the counterweight may move along any direction or orientation as previously described (e.g., parallel to the optical axis, perpendicular to the optical axis, rotationally about an axis, at an angle to the optical axis, etc).

Alternatively or in addition, one or more counterweights 518 may be coupled to a movable object, e.g., a UAV. The one or more counterweights may move in correspondence with a movement of the zoom lens to maintain a stability of an imaging system comprising the imaging device, carrier, and the UAV. For example, a movement of the one or more counterweights may correspond with a movement of the zoom lens, and a center of gravity 520 of the imaging system (e.g., comprising the imaging device, carrier, and the movable object) may be maintained. While one possible position of the counterweight 518 is illustrated, it is to be understood that the counterweight may be located elsewhere (e.g., on top of, on a side of, behind, in-front of, below the UAV, elsewhere on the UAV, contained within the UAV, etc). Moreover, while a single orientation and movement of the counterweight is illustrated (e.g., parallel to the optical axis), it is to be understood that the counterweight may move along any direction or orientation as previously described (e.g., along the optical axis, perpendicular to the optical axis, rotationally about an axis, at an angle to the optical axis, etc).

FIG. 6 illustrates additional components of an imaging system, in accordance with embodiments. The imaging system may comprise an aperture through which light may enter. Light may enter through a single aperture 601 on the imaging system. In some embodiments, light may enter through a plurality of apertures, such as two, three, four, five or more apertures.

Light may be focused by a lens module 604 (e.g., previously as described herein) and directed onto a sensor 606 leading to generation of image data (e.g., regarding the environment). Images of an environment (e.g., near or around the imaging system) may be captured by the imaging system. The imaging system may continuously capture images. The imaging system may capture images at a specified frequency to produce a series of image data over time. Images may be captured at a high enough frequency to provide video-rate capturing. Images may be captured at a rate of at least 10 Hz, 20 Hz, 30 Hz, 40 Hz, 50 Hz, 60 Hz, 70 Hz, 80 Hz, 90 Hz, 100 Hz, 120 Hz, 150 Hz, 200 Hz, 250 Hz, or 300 Hz.

The imaging system may comprise an optical axis. In some instances, an imaging system may comprise a single optical axis. An optical axis may refer to a line along which there is some degree of rotational symmetry in the lens module. The optical axis may be defined by a line along which light propagates through the lens module. The optical axis may pass through a center of the lens module. For example, line 602 may define an optical axis of the imaging system, or the lens module.

The imaging system may comprise a lens module and a sensor (e.g., image sensor). The lens module may direct light to the image sensor. The image sensor may capture the directed light. The lens module may comprise one or more lens elements configured to move. The lens module may comprise a zoom lens. In some instances, the lens module may comprise a lens barrel configured to receive the one or more lenses. The lens barrel may house the one or more lenses. In some instances, the lens barrel may be used to adjust a focal length of the lens module by adjusting a distance between the one or more lenses. In some instances, the lens barrel may additionally be used to move one or more counterweights 608. The lens may be configured to direct light to the image sensor. Optionally, other optical elements, such as mirrors, filters, gratings, additional lenses, or dichroics, may be provided that may aid in directing light to the image sensor.

The lens module may have a corresponding focal length range. A focal length range may include multiple focal lengths falling within a lower limit and an upper limit of the range. A focal length of a lens may measure how strongly the lens converges or diverges light. The focal length of an optical lens may refer to the distance over which initially collimated rays are brought to a focus.

The lens module may comprise prime lenses and/or zoom lenses. A prime lens may have a fixed, single focal length. A prime lens may refer to a stationary lens that does not move. A zoom lens may have variable focal lengths and the focal length may encompass a plurality of focal lengths (e.g., focal length range). A zoom lens may comprise a plurality of different group of lenses, e.g., focusing group, master group, compensator group, variator group, etc. In some instances, the one or more counterweights referred throughout may be operably coupled to a specified group within the lens module. An optical zoom lens may vary the focal length by a relative movement of a set of internal lens elements.

In some instances, a lower limit of the focal length range for a zoom lens suitable for the lens module may be less than or equal to 1 mm, 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, or 1150 mm. Optionally, the lower limit of the focal length range for a zoom lens suitable for the lens module may be greater than or equal to any of the values described herein. The lower limit of the focal length range for a zoom lens suitable for the lens module may have a value falling within a range between any two of the values described herein.

In some instances, an upper limit of the focal length range for a zoom lens suitable for the lens module may be less than or equal to 2 mm, 4 mm, 6 mm, 5 mm, 6 mm, 8 mm, 10 mm, 12 mm, 14 mm, 16 mm, 18 mm, 20 mm, 22 mm, 24 mm, 26 mm, 28 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 450 mm, 500 mm, 550 mm, 600 mm, 650 mm, 700 mm, 750 mm, 800 mm, 850 mm, 900 mm, 950 mm, 1000 mm, 1150 mm, or 2000 mm. Optionally, the upper limit of the focal length range for a zoom lens suitable for the lens module may be greater than or equal to any of the values described herein. The upper limit of the focal length range for a zoom lens suitable for the lens module may have a value falling within a range between any two of the values described herein.

A zoom ratio is a ratio of the longest to shortest focal lengths of zoom type imaging system such as a zoom camera. For example, a zoom lens with focal lengths ranging from 100 mm to 400 mm may be described as a 4:1 or "4×" zoom. The larger a zoom ratio of an optical module is, the larger a remote object may be shown on the captured image. In some instances, the zoom ratio of a zoom lens may higher than 1×, 1.5×, 2×, 2.5×, 3×, 3.5×, 4×, 4.5×, 5×, 5.5×, 6×, 6.5×, 7×, 7.5×, 8×, 8.5×, 9×, 9.5×, 10×, 11×, 12×, 13×, 14×, 15×, 16×, 17×, 18×, 19×, 20, 30×, 40×, 50×, 60×, 70×, 80×, 100×, 120×, 140×, 160×, 180×, 200×, 250×, 300×, 350×, 400×, 450×, 500×, 600×, 700×, 800×, or 1000×. Optionally, the zoom ratio of a zoom lens may be higher than or equal to any of the values described herein. The zoom ratio of a zoom lens may have a value falling within a range between any two of the values described herein.

The lens module may magnify an image. FIG. 7 illustrates magnification on a vertical axis. The line segment AB is perpendicular to the optical axis 702 of the lens 704. The Line segment CD is the image of AB. The magnification on vertical axis is the ratio of a size of the image CD and a size of the object AB, e.g. CD/AB.

FIG. 8 illustrates an imaging principle. If an image is formed at position A2 by a lens 802 corresponding to an object at position A1, then, an image can be formed at position B2 corresponding to an object at position B1. The imaging principle may be dictated by the follow equation:

$$1/o + 1/i = 1/f,$$

where o is the distance from the lens to the object, i is equal to the distance from the lens to the image formed, and f is the focal length of the lens. The imaging principle may dictate that as an object becomes closer to a lens, the image is formed further away from the lens. The imaging principle may dictate that as an object becomes further away from a lens, the image is formed closer to the lens. FIG. 9 illustrates an object-image exchanging principle. The object-image exchanging principle dictates that if an image is formed at position A2 by a lens 902 from an object located at position A1 as shown in reference 904, then an can be formed at position A1 by the lens from an object located at position A2 as shown in reference 906. Accordingly, the object-image exchanging principle dictates that the position of an object and its image formed by a lens can be swapped and/or interchanged.

FIG. 10 illustrates a zoom lens system with optical axis 1002. In a zoom lens system, the zooming may be achieved by moving a position of the zoom lens set. Position 1 may refer to a position of a front fixed lens set. A distance h may be known (e.g., ½ diameter of lens). Position 2 may refer to one possible position of the zoom lens set, and may be a reference position. Position 3 may refer to another possible position of the zoom lens set (e.g., the zoom lens set has moved), and may be a desired position (e.g., desired focal length). Position 2 and position 3 may satisfy the "object-image exchanging principle." The focal length of the front fixed lens set may be known and may be defined by the following equation (1) f1=h/tan(a1). In addition, the synthesized focal length of the front fixed lens set at position 1 and the zoom lens set at position 2 may be defined by the following equation: (2) f12=h/tan(a2). Therefore, f12=(h/tan(a1))*(tan(a1)/tan(a2)), or f12=f1*b1, where b1 is the magnification on a vertical axis of the zoom lens set at position 2. Similarly, the synthesized focal length of the front fixed lens set at position 1 and the zoom lens set at position 3 may be calculated according to the following: f13=h/tan(a3)=(h/tan(a1))*(tan(a1)/tan(a3))=f1*b2, where b2 is the magnification on a vertical axis of the zoom lens set at position 3. Therefore, the ratio of focal length change when the zoom lens set moves from position 2 to position 3 is: $M=f12/f13=(f1*b1)/(f1*b2)=b1/b2$. Assuming that position 2 and position 3 satisfies the "object-image exchanging principle," magnification on a vertical axis of zoom lens set at position 3 may equal 1/b1 and the ratio of focal length change when the zoom lens set moves from position 2 to position 3 is: $M=f12/f13=(f1*b1)/(f1/b1)=b1*b1$.

During the zooming process, a "focusing motor" inside the lens may be moved to ensure definition of the captured image. The target position of the focusing motor may be determined by obtaining a position of the zooming motor and a position of the focusing motor and looking up in a lookup table which is calibrated in factory.

Each optical module of the imaging system may comprise an image sensor. Image sensor as used herein may also be referred to as a sensor. The light focused by the lens may be directed onto the image sensor of the optical module. The image sensor may be at a predetermined distance away from the lens module. For example, the distance from the image sensor to the lens module may correspond to the focal length of the lens module. In some instances, the image sensor may have a variable distance to the lens module (e.g., zoom lens). The image sensor may be positioned such that a focal plane of the captured image is coplanar with the image sensor plane.

The image sensor may refer to a device that converts optical information (e.g., light striking the sensor surface may comprise optical information) into digital information (e.g., electronic signals). Converting optical information into digital information may herein be referred to as capturing an image (e.g., image data). An image sensor may detect and convey information that constitutes an image. The image sensors may be of a charge-coupled devices (CCD) type, a complementary metal-oxide-semiconductor (CMOS) type, an N-type metal-oxide-semiconductor (NMOS) type, or a back-side illuminated CMOS (BSI-CMOS) type. Each optical module of an imaging system may have the same type of image sensor, or different types of image sensors. The image sensor may have a set number of pixels. For example the image sensor may have about 1, 2, 3, 4, 5, 6, 8, 10, 12, 14, 16, 18, 20, 25, 30, 35, 40, 50, 60, 70, 80, 90, or 100 megapixels. The number of pixels in an image sensor may determine a physical size of a generated image.

The imaging system may have a field of view (FOV) associated with it. A FOV may refer to a part of the world that is visible on an imaging system at a particular position and orientation in space. Objects outside the FOV when an image is taken may not be recorded in a photograph. FOV may also be expressed as an angular size of the view cone, or as an angle of view. A FOV of an optical module may depend on the sensor size and the focal length. For an optical lens, the field of view angle α can be calculated as FOV $\alpha=2 \arctan(d/2f)$, where d is image sensor size, and f is focal length of the lens.

For an image sensor having a fixed size, a zoom lens (e.g., lens module, optical module) may have variable FOV angular range and the FOV angular range may encompass a plurality of FOV angles. The FOV may depend on one or more lenses or other optical elements (e.g., sensor) of the optical modules.

In some instances, a lower limit of the FOV angular range for a zoom lens may be less than or equal to about 170°, 169°, 165°, 160°, 155°, 150°, 145°, 140°, 135°, 130°, 125°, 120°, 115°, 110°, 105°, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the lower limit of the FOV angular range for a zoom may be greater than or equal to any of the values described herein. In some instances, the lower limit of the FOV angular range for a zoom lens may have a value falling within a range between any two of the values described herein.

In some instances, an upper limit of the FOV angular range for a zoom lens may be less than or equal to about 170°, 169°, 165°, 160°, 155°, 150°, 145°, 140°, 135°, 130°, 125°, 120°, 115°, 110°, 1050, 100°, 95°, 90°, 85°, 80°, 75°, 70°, 65°, 60°, 55°, 50°, 45°, 40°, 35°, 30°, 25°, 20°, 15°, 10°, 5°, 3°, 2°, or 1°. Optionally, the upper limit of the FOV angular range for a zoom lens may be greater than or equal to any of the values described herein. The upper limit of the FOV angular range for a zoom lens may have a value falling within a range between any two of the values described herein.

The imaging system may further comprise an image processor configured to (1) receive image data from the sensors, and (2) generate data to display at least one image captured using the lens module and/or the sensors. In some embodiments, the image processor may be provided onboard a movable object, such as a UAV or a mobile phone. In some embodiments, the image processor may be provided on board an imaging system (e.g., camera) of the movable object. The image processor may be within or outside a housing of the imaging system. In some instances, the image processor may be provided off-board the imaging system of the movable object. The image processor may be provided on a carrier, such as a gimbal, further described below. Alternatively, the image processor may be provided remote to the movable object. For instance, the image processor may be provided on a remote controller (e.g., cell phone, PDA, etc), server, ground station (e.g., desktop computer, laptop, charging station, etc), or cloud-based infrastructure. Information from one or more optical modules may be wirelessly transmitted to the image processor. Alternatively, information from the optical modules may be provided to the image processor via a physical connection. The image processor may be implemented by a Central Processing Unit (CPU), Application Specific Integrated Circuit (ASIC), or Field Programmable Gate Array (FPGA). Any description herein of a processor may apply to one or more processors, which may individually or collectively perform any functions described for the image processor. The image processor may include a single or multiple processors. The image processor may be capable of executing one or more steps in accordance with non-transitory computer readable media comprising code, logic, or instructions for performing one or more steps. Memory storage units may be provided which may comprise the non-transitory computer readable media.

In some instances, the image processor may receive a desired FOV (e.g., a desired focal length, a desired magnification, a desired zoom, a desired direction, etc). The desired FOV may be received, for example, from a user. For instance, an instruction of a desired FOV may be received from the user through a remote terminal. The user may select a desired FOV and send the instruction of a FOV by operating buttons provided on the remote terminal or by touching soft buttons displayed on a screen of the remote terminal. In some instances, a user may observe a display showing an environment that is to be captured by the imaging system (e.g., in real time). The user may increase or decrease the FOV (e.g., focal length, zoom ratio, etc) of the environment in the display (e.g., via touchscreen interface, physical buttons, etc) that is to be captured by the imaging system. Once a user confirms the FOV that is to be captured by the imaging system (e.g., by pushing the display screen or a button), the desired FOV may be received by the image processor.

In some instances, the desired FOV may be determined by one or more processors. In some instances, the one or more processors may determine the desired FOV (e.g., by analyzing the image of the environment to be captured). The one or more processors may determine the desired FOV automatically without any human input. In some instances, the one or more processors may determine the desired FOV semi-automatically, for example, according to a set criterion pre-input by a user. In some instances, the one or more processors may determine or control external factors to affect the FOV of the images to be captured. For example, the one or more processors may affect a direction or orientation of a carrier (e.g., gimbal) or movable object (e.g., UAV) coupled with the imaging system.

FIG. 11 illustrates a block diagram for transmission of zoom control, in accordance with embodiments. In some instances, once a user confirms the FOV that is to be captured by the imaging system on a user interface A (e.g., by pushing the display screen or a button), a control signal may be transmitted from the user interface to a ground terminal of data transmission system B. In some instances, the control signal may be transmitted from the user interface to the ground terminal through wired communication (e.g., USB). In some instances, the control signal may be transmitted from the user interface to the ground terminal through wireless communication. In some instances, the user interface and the ground terminal may be integrated.

Afterwards, the ground terminal (e.g., remote terminal) may transmit the control signal to a module C via an uplink, e.g., wireless link. The wireless link between the imaging system and the remote terminal may be a RF (radio frequency) link, a Wi-Fi link, a Bluetooth link, a 3G link, or a LTE link. The wireless link may be used for transmission of control data over long distances. For example, the wireless link may be used over distances equal to or greater than about 5 m, 10 m, 15 m, 20 m, 25 m, 50 m, 100 m, 150 m, 200 m, 250 m, 300 m, 400 m, 500 m, 750 m, 1000 m, 1250 m, 1500 m, 1750 m, 2000 m, 2500 m, 3000 m, 3500 m, 4000 m, 4500 m, 5000 m, 6000 m, 7000 m, 8000 m, 9000 m, or 10000 m. The control signals may be uplinked directly to the module C. Module C may be a component of the imaging system (e.g., receiver located on an imaging device). The control signals may be sent to a receiver of the imaging system. The imaging system may comprise one or more receivers. For example, an imaging device may comprise a receiver. Alternatively or in addition, a receiver may be located elsewhere, e.g., on a carrier, on a movable object, etc.

The one or more receivers may be configured to receive the control signals. The control signals may be further forwarded (e.g., transmitted) elsewhere. For example, the control signals may be transmitted to one or more motors of the imaging system. The one or more motors may be configured to control components of the imaging system, e.g., the zoom lens. The control signals may be configured to control a movement of one or more movable lens elements (e.g., lens module) of the imaging system. For example, the control signals may comprise instructions (e.g., signals) that actuate movement of a motor. The motor may be coupled to the lens module as previously described herein and drive a movement of the one or more lens elements. Accordingly, a focal length of the imaging system may be varied far away from remote terminal via an optical zooming system (e.g., by movement of one or more lens elements, or by a zoom lens). The control of movement of the lens module via the wireless link enables optical zooming over great distances traditionally barred in systems utilizing optical zoom via infrared signals. Moreover, direct transmission of control signals for optical zooming may eliminate unnecessary components traditionally needed for achieving optical zooming in UAV systems, e.g., control ring on the lens, to adjust a focus of the ring of the lens.

In some instances, the control signals may be configured to control a movement of the one or more counterweights. For example, the motor coupled to the lens module may also be coupled to the one or more counterweights. Movement of the motor may drive a movement of the one or more lens elements in one direction and a movement of the one or more counterweights in an opposite direction.

In some instances, the control signals may be received at two or more receivers. For example, an imaging device may comprise a receiver and a movable object to which the imaging device is coupled to may comprise a receiver. The controls signals received by each of the different receivers may actuate movement of different motors. For example, the control signal received by a receiver of the imaging device may actuate a movement of a motor coupled to the lens module (e.g., of the imaging device) while the control signal received by a receiver of the movable object may actuate a movement of a motor coupled to one or more counterweights coupled to a carrier or the movable object.

Images captured by the imaging system may be shown on a display. The images may be shown on the display in real time. The display may be a device appropriate for displaying images or videos, for example, a LCD (Liquid Crystal Display), a CRT (Cathode Ray Tube), an OLED (Organic Light Emitting Diodes), or a Plasma. The display may display the image based on the image data generated by the image processor. In some embodiments, the display may be a local display device of the imaging system. In some instances, the display may be provided on a movable object or the stationary object carrying the imaging system. In some instances, the display may be provided on a mobile device, such as a cellphone, PDA, tablet, or controller. Alternatively, the display may be a display device remote to the imaging system. In some instances, the display may be a remote terminal such as a smartphone, a tablet, a laptop or a personal computer, which receives the image data from the imaging system via a wireless link. The wireless link between the imaging system and the display may be a RF (radio frequency) link, a Wi-Fi link, a Bluetooth link, a 3G link, or a LTE link.

The display may also function as an input device for receiving a user's instruction with regard to the images (e.g., to be captured and or generated). In some instance, the display may be an interactive screen, by which the user may select a desired focal length, desired magnification, desired field of view, etc of the environment to be shown on the display. The display may be a touchscreen. Alternatively, the user may interact with the display using any user interactive device, such as a mouse, keyboard, joystick, trackball, touchpad, or microphone.

In some instances, a user may select a FOV to be shown in the display. For example, the user may select a wider or narrower FOV to be shown in the display. For example, a user may zoom in or out of the image shown in the display via input on the controller (e.g., physical buttons or via touch screen input). In some instances, a user may adjust a FOV shown in the display via input on the controller. For example, the user may adjust the FOV so that the FOV is translated (e.g., up, down, left, right) and/or rotated via physical buttons on the controller or via input on a touch screen. In some instances, a user may select (e.g., via input on a touch screen) a point, portion, or object shown within the display. For example, a user may tap the point, portion, or object shown within the display with a finger. An image shown in the display may be re-centered such that the point, portion, or object selected by the user may be at a center of the display after such selection. After re-centering, the image shown in the display may (again) comprise an inner FOV comprised of fused parts and an outer FOV comprised of a scaled image. For example, the selected point, portion, or object may be displayed with a high quality, and without instability.

The systems and methods described hereinabove may permit a user to maintain a stability of imaging systems which may be useful for general photography and/or UAV operations. Maintaining stability may be desired for acquisition of smooth images of high quality and/or for optimal use of resources. The need for stability may be especially desired in applications involving the use of UAVs untethered from the ground as the UAVs, lacking solid support, may be affected easily by the environment or a change in state.

For example, for UAVs coupled with an imaging device comprising an optical zooming system (e.g., zoom lens), movement of the zoom lens, which are heavy and large, may alter a center of gravity (e.g., of the imaging device, of the UAV, etc) which may unintentionally alter a field of view of the imaging device and/or alter a flight path of the UAV. In some instances, a movement of the zoom lens may prompt a response from a carrier (e.g., gimbal) leading to wasted resources (e.g., energy, battery, etc) and an inability to acquire smooth images during a zoom operation.

In some instances, counterweights may be provided on-board the imaging system which may move in correspondence with the movement of the one or more movable lens elements. The counterweights may maintain a center of gravity of the imaging system and enable acquisition of high quality, smooth, stable images while simultaneously improving overall performance of the imaging system. While counterweights have primarily been described with respect to movable lens elements, it is to be understood that counterweights may be operably be coupled to any movable components of the imaging system. For example, if the imaging system comprises a carrier capable of translational movement, the carrier may be coupled with one or more counterweights configured to maintain a stability (e.g., center of gravity) of the imaging system. With aid of the one or more counterweights, the imaging system as described throughout may be utilized in various methods for maintaining a stability of the imaging system and/or for capturing stable images.

In the embodiments discussed hereinabove, images may be captured and displayed by the imaging system of the present invention. However, the imaging system may also be used to capture and display videos.

The systems, devices, and methods described herein can be applied to a wide variety of objects, including movable objects and stationary objects. As previously mentioned, any description herein of an aerial vehicle, such as a UAV, may apply to and be used for any movable object. Any description herein of an aerial vehicle may apply specifically to UAVs. A movable object of the present invention can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be an aerial vehicle. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). An aerial vehicle can be self-propelled, such as self-propelled through the air. A self-propelled aerial vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. The movable object may be controlled remotely via an occupant within a separate vehicle. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$. 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$. Conversely, the total volume of the movable object may be greater than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm$^3$, 300 cm$^3$, 500 cm$^3$, 750 cm$^3$, 1000 cm$^3$, 5000 cm$^3$, 10,000 cm$^3$, 100,000 cm$^3$, 1 m$^3$, or 10 m$^3$.

In some embodiments, the movable object may have a footprint (which may refer to the lateral cross-sectional area encompassed by the movable object) less than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm2. Conversely, the footprint may be greater than or equal to about: 32,000 cm$^2$, 20,000 cm$^2$, 10,000 cm$^2$, 1,000 cm$^2$, 500 cm$^2$, 100 cm$^2$, 50 cm$^2$, 10 cm$^2$, or 5 cm$^2$.

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

FIG. 12 illustrates an unmanned aerial vehicle (UAV) 1200, in accordance with embodiments of the present invention. The UAV may be an example of a movable object as described herein, to which the method and apparatus of discharging a battery assembly may be applied. The UAV 1200 can include a propulsion system having four rotors 1202, 1204, 1206, and 1208. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 1210. For example, the length 1210 can be less than or equal to 2 m, or less than equal to 5 m. In some embodiments, the length 1210 can be within a range from 40 cm to 1 m, from 10 cm to 2 m, or from 5 cm to 5 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

In some embodiments, a UAV can include one or more vision sensors, also referred to herein as "imaging devices." While many embodiments are described herein as having one imaging device coupled to a UAV, it is to be understood that any number of imaging devices may be coupled to a UAV, such as one, two, three, four, five or more imaging devices. An imaging device can be configured to detect electromagnetic radiation (e.g., visible, infrared, and/or ultraviolet light) and generate image data based on the detected electromagnetic radiation. For example, an imaging device may include a charge-coupled device (CCD) sensor or a complementary metal-oxide-semiconductor (CMOS) sensor that generates electrical signals in response to wavelengths of light. The resultant electrical signals can be processed to produce image data. The image data generated by an imaging device can include one or more images, which may be static images (e.g., photographs), dynamic images (e.g., video), or suitable combinations thereof. The image data can be polychromatic (e.g., RGB, CMYK, HSV) or monochromatic (e.g., greyscale, black-and-white, sepia).

In some embodiments, the imaging device can be a camera. A camera can be a movie or video camera that captures dynamic image data (e.g., video). A camera can be a still camera that captures static images (e.g., photographs). A camera can be a binocular camera. A binocular camera as used herein may refer to a stereo, or a stereovision camera. A stereo camera may comprise two cameras. A camera may be a monocular camera. Although certain embodiments provided herein are described in the context of cameras, it shall be understood that the present disclosure can be applied to any suitable imaging device. Any description herein relating to cameras can also be applied to any suitable imaging device or other types of imaging devices. A camera can be used to generate 2D images of a 3D scene (e.g., an environment, one or more objects, etc.). The images generated by the camera can represent the projection of the 3D scene onto a 2D image plane. Accordingly, each point in the 2D image corresponds to a 3D spatial coordinate in the scene. The camera may comprise optical elements (e.g., lens, mirrors, filters, etc). The camera may capture color images, greyscale image, infrared images, and the like.

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The imaging device may capture an image or a sequence of images at a specific image resolution. In some embodiments, the image resolution may be defined by the number of pixels in an image. In some embodiments, the image resolution may be greater than or equal to about 352×420 pixels, 480×320 pixels, 720×480 pixels, 1280×720 pixels, 1440×1080 pixels, 1920×1080 pixels, 2048×1080 pixels, 3840×2160 pixels, 4096×2160 pixels, 7680×4320 pixels, or 15360×8640 pixels. The camera may be a 4K camera or a camera with a higher resolution.

The imaging device may have adjustable parameters. Under differing parameters, different images may be captured by the imaging device while subject to identical external conditions (e.g., location, lighting). The adjustable parameter may comprise exposure (e.g., exposure time, shutter speed, aperture, film speed), gain, gamma, area of interest, binning/subsampling, pixel clock, offset, triggering, ISO, etc. Parameters related to exposure may control the amount of light that reaches an image sensor in the imaging device. For example, shutter speed may control the amount of time light reaches an image sensor and aperture may control the amount of light that reaches the image sensor in a given time. Parameters related to gain may control the amplification of a signal from the optical sensor. ISO may control the level of sensitivity of the camera to available light. Parameters controlling for exposure and gain may be collectively considered and be referred to herein as EXPO.

The imaging devices may each have a field of view. The field of view of an imaging device may be the extent of the environment that is detectable (e.g., visible) by the imaging device. The field of view may be related to the angle of view, which may be measured by the angular extent of a given scene that is imaged by the imaging device. The angle of view of an imaging device may be at an angle of less than or about 360°, 300°, 240°, 180°, 150°, 120°, 90°, 60°, 30°, 20°, or 10°. The field of view may be described by the relative direction of the imaging device to the movable object. For example, the field of view may be oriented vertically, horizontally, upward, downward, side-ways, and the like relative to the movable object (e.g., a UAV). The imaging devices may each have an optical axis. The optical axis of an imaging device, which may also be referred to as the "principal axis," can be a line along which there is some degree of rotational symmetry in the imaging device. In some embodiments, the optical axis of the imaging device passes through the center of the optical components (e.g., lens, photo sensor) of the imaging device.

Imaging devices of the present disclosure can be situated on any suitable portion of a movable object, such as above, underneath, on the side(s) of, or within a body of the movable object. Some imaging devices can be mechanically coupled to the UAV such that the spatial disposition and/or motion of the movable object correspond to the spatial disposition and/or motion of the imaging device. The imaging devices can be coupled to the movable object via a rigid coupling, such that the imaging device does not move relative to the portion of the movable object to which it is attached. Alternatively, the coupling between the imaging device and the movable object can permit movement (e.g., translational or rotational movement relative to the UAV) of the imaging device relative to the movable object. For example, coupling between the imaging device and the movable object via a carrier such as a gimbal may permit movement of the imaging device relative to the movable object. The movement of the imaging device relative to the movable object may be translational (e.g., vertical, horizontal) and/or rotational (e.g., about a pitch, yaw, and/or roll axis). The movement of the imaging device relative to the movable object may be of a predetermined or known amount. One or more sensors may detect the movement of the imaging device relative to the vehicle. The movement of the imaging device relative to the movable object may be controlled remotely by user input, autonomously, or semi-autonomously. The coupling can be a permanent coupling or non-permanent (e.g., releasable) coupling. Suitable coupling methods can include adhesives, bonding, welding, and/or fasteners (e.g., screws, nails, pins, etc.). Optionally, the imaging device can be integrally formed with a portion of the movable object. Furthermore, the imaging device can be electrically coupled with a portion of the movable object (e.g., processing unit, control system, data storage) so as to enable the data collected by the imaging device to be used for various functions of the UAV (e.g., navigation, control, propulsion, communication with a user or other device, etc.), such as the embodiments discussed herein. The imaging device may be operably coupled with a portion of the UAV (e.g., processing unit, control system, data storage).

One or more images may be captured by an imaging device. A sequence of two or more images may be captured by an imaging device. For example, a sequence of about 2, 3, 4, 5, 10, 15, 20, 25, 50, 100, 150, 200, or more images may be captured by the imaging device. The imaging device may capture a sequence of images at a specific capture rate. In some embodiments, the sequence of images may be captured at standard video frame rates such as about 24p, 25p, 30p, 48p, 50p, 60p, 72p, 90p, 100p, 120p, 300p, 50i, or 60i. In some embodiments, the sequence of images may be captured at a rate less than or equal to about one image every 0.0001 seconds, 0.0002 seconds, 0.0005 seconds, 0.001 seconds, 0.002 seconds, 0.005 seconds, 0.002 seconds, 0.05 seconds, 0.01 seconds, 0.02 seconds, 0.05 seconds, 0.1 seconds, 0.2 seconds, 0.5 seconds, 1 second, 2 seconds, 5 seconds, or 10 seconds. In some embodiments, the capture rate may change depending on user input and/or external conditions (e.g. rain, snow, wind, texture of environment being captured).

FIG. 13 illustrates a movable object 1300 including a carrier 1302 and a payload 1304, in accordance with embodiments of the present invention. Although the movable object 1300 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 1304 may be provided on the movable object 1300 without requiring the carrier 1302. The movable object 1300 may include propulsion mechanisms 1306, a sensing system 1308, and a communication system 1310.

The propulsion mechanisms 1306 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 1306 can be mounted on the movable object 1300 using any suitable means, such as a support element (e.g., a drive shaft) as described elsewhere herein. The propulsion mechanisms 1306 can be mounted on any suitable portion of the movable object 1300, such on the top, bottom, front, back, sides, or suitable combinations thereof.

In some embodiments, the propulsion mechanisms 1306 can enable the movable object 1300 to take off vertically from a surface or land vertically on a surface without requiring any horizontal movement of the movable object 1300 (e.g., without traveling down a runway). Optionally, the propulsion mechanisms 1306 can be operable to permit the movable object 1300 to hover in the air at a specified position and/or orientation. One or more of the propulsion mechanisms 1300 may be controlled independently of the other propulsion mechanisms. Alternatively, the propulsion mechanisms 1300 can be configured to be controlled simultaneously. For example, the movable object 1300 can have multiple horizontally oriented rotors that can provide lift and/or thrust to the movable object. The multiple horizontally oriented rotors can be actuated to provide vertical takeoff, vertical landing, and hovering capabilities to the movable object 1300. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 1300 (e.g., with respect to up to three degrees of translation and up to three degrees of rotation).

The sensing system 1308 can include one or more sensors that may sense the spatial disposition, velocity, and/or acceleration of the movable object 1300 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 1308 can be used to control the spatial disposition, velocity, and/or orientation of the movable object 1300 (e.g., using a suitable processing unit and/or control module, as described below). Alternatively, the sensing system 1308 can be used to provide data regarding the environment surrounding the movable object, such as weather conditions, proximity to potential obstacles, location of geographical features, location of manmade structures, and the like.

The communication system 1310 enables communication with terminal 1312 having a communication system 1314 via wireless signals 1316. The communication systems 1310, 1314 may include any number of transmitters, receivers, and/or transceivers suitable for wireless communication. The communication may be one-way communication, such that data can be transmitted in only one direction. For example, one-way communication may involve only the movable object 1300 transmitting data to the terminal 1312, or vice-versa. The data may be transmitted from one or more transmitters of the communication system 1310 to one or more receivers of the communication system 1312, or vice-versa. Alternatively, the communication may be two-way communication, such that data can be transmitted in both directions between the movable object 1300 and the terminal 1312. The two-way communication can involve transmitting data from one or more transmitters of the communication system 1310 to one or more receivers of the communication system 1314, and vice-versa.

In some embodiments, the terminal 1312 can provide control data to one or more of the movable object 1300, carrier 1302, and payload 1304 and receive information from one or more of the movable object 1300, carrier 1302, and payload 1304 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 1306), or a movement of the payload with respect to the movable object (e.g., via control of the carrier 1302). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 1308 or of the payload 1304). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 1312 can be configured to control a state of one or more of the movable object 1300, carrier 1302, or payload 1304. Alternatively or in combination, the carrier 1302 and payload 1304 can also each include a communication module configured to communicate with terminal 1312, such that the terminal can communicate with and control each of the movable object 1300, carrier 1302, and payload 1304 independently.

In some embodiments, the movable object 1300 can be configured to communicate with another remote device in addition to the terminal 1312, or instead of the terminal 1312. The terminal 1312 may also be configured to communicate with another remote device as well as the movable object 1300. For example, the movable object 1300 and/or terminal 1312 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 1300, receive data from the movable object 1300, transmit data to the terminal 1312, and/or receive data from the terminal 1312. Optionally, the remote device can be connected to the Internet or other telecommunications network, such that data received from the movable object 1300 and/or terminal 1312 can be uploaded to a website or server.

FIG. 14 is a schematic illustration by way of block diagram of a system 1400 for controlling a movable object, in accordance with embodiments of the present invention. The system 1400 can be used in combination with any suitable embodiment of the systems, devices, and methods disclosed herein. The system 1400 can include a sensing module 1402, processing unit 1404, non-transitory computer readable medium 1406, control module 1408, and communication module 1410.

The sensing module 1402 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 1402 can be operatively coupled to a processing unit 1404 having a plurality of processors. In some embodiments, the sensing module can be operatively coupled to a transmission module 1412 (e.g., a Wi-Fi image transmission module) configured to directly transmit sensing data to a suitable external device or system. For example, the transmission module 1412 can be used to transmit images captured by a camera of the sensing module 1402 to a remote terminal.

The processing unit 1404 can have one or more processors, such as a programmable processor (e.g., a central processing unit (CPU)). The processing unit 1404 can be operatively coupled to a non-transitory computer readable medium 1406. The non-transitory computer readable medium 1406 can store logic, code, and/or program instructions executable by the processing unit 1404 for performing one or more steps. The non-transitory computer readable medium can include one or more memory units (e.g., removable media or external storage such as an SD card or random access memory (RAM)). In some embodiments, data from the sensing module 1402 can be directly conveyed to and stored within the memory units of the non-transitory computer readable medium 1406. The memory units of the non-transitory computer readable medium 1406 can store logic, code and/or program instructions executable by the processing unit 1404 to perform any suitable embodiment of the methods described herein. For example, the processing unit 1404 can be configured to execute instructions causing one or more processors of the processing unit 1404 to analyze sensing data produced by the sensing module. The memory units can store sensing data from the sensing module to be processed by the processing unit 1404. In some embodiments, the memory units of the non-transitory computer readable medium 1406 can be used to store the processing results produced by the processing unit 1404.

In some embodiments, the processing unit 1404 can be operatively coupled to a control module 1408 configured to control a state of the movable object. For example, the control module 1408 can be configured to control the propulsion mechanisms of the movable object to adjust the spatial disposition, velocity, and/or acceleration of the movable object with respect to six degrees of freedom. Alternatively or in combination, the control module 1408 can control one or more of a state of a carrier, payload, or sensing module.

The processing unit 1404 can be operatively coupled to a communication module 1410 configured to transmit and/or receive data from one or more external devices (e.g., a terminal, display device, or other remote controller). Any suitable means of communication can be used, such as wired communication or wireless communication. For example, the communication module 1410 can utilize one or more of local area networks (LAN), wide area networks (WAN), infrared, radio, Wi-Fi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 1410 can transmit and/or receive one or more of sensing data from the sensing module 1402, processing results produced by the processing unit 1404, predetermined control data, user commands from a terminal or remote controller, and the like.

The components of the system 1400 can be arranged in any suitable configuration. For example, one or more of the components of the system 1400 can be located on the movable object, carrier, payload, terminal, sensing system, or an additional external device in communication with one or more of the above. Additionally, although FIG. 14 depicts a single processing unit 1404 and a single non-transitory computer readable medium 1406, one of skill in the art would appreciate that this is not intended to be limiting, and that the system 1400 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 1400 can occur at one or more of the aforementioned locations.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. An optical zooming system with a stationary center of gravity, comprising:
 a lens element accommodated in a housing of an imaging device and configured to move along an optical axis, the lens element being coupled to a gimbal external to the imaging device at a first location; and
 a counterweight operably coupled to the lens element and configured to maintain a center of gravity of the optical zooming system during movement of the lens element, the counterweight being coupled to the gimbal at a second location, and the counterweight including a deformable material.

2. The system of claim 1, wherein the counterweight is configured to move in correspondence with the movement of the lens element.

3. The system of claim 2, wherein a movement of the counterweight is equidistant to the movement of the lens element.

4. The system of claim 2, wherein a movement of the counterweight is in a direction opposite to the movement of the lens element.

5. The system of claim 2, wherein a movement of the counterweight is simultaneous with the movement of the lens element.

6. The system of claim 1, wherein the lens element and the counterweight are coupled to at least a common mechanical element.

7. The system of claim 6, wherein the common mechanical element is a threaded rod.

8. The system of claim 7, wherein the lens element and the counterweight are situated on different threads of the threaded rod.

9. The system of claim 1, wherein the optical zooming system is on-board an imaging device.

10. The system of claim 1, further comprising:
 a receiver configured to receive control signals configured to control the movement of the lens element.

11. The system of claim 1, wherein the system is coupled to a movable object.

12. The system of claim 11, wherein the movable object is an unmanned aerial vehicle (UAV).

13. The system of claim 1, wherein the system is coupled to a movable object through the gimbal.

14. The system of claim 13, wherein the movable object is an unmanned aerial vehicle (UAV).

15. The system of claim 1,
 wherein the counterweight is a first counterweight,
 the system further comprising at least one of:
 a second counterweight disposed at the housing of the imaging device; or
 a third counterweight disposed at a movable object that carries the imaging device through the gimbal.

16. The system of claim 1, wherein the counterweight includes a hollow structure filled with the deformable material.

* * * * *